United States Patent
Pabon et al.

(10) Patent No.: US 9,110,192 B2
(45) Date of Patent: Aug. 18, 2015

(54) METHODS AND APPARATUS TO IDENTIFY LAYER BOUNDARIES IN SUBTERRANEAN FORMATIONS

(75) Inventors: Jahir Pabon, Newton, MA (US); Henri-Pierre Valero, Kanagawa-Ken (JP); Benoit Froelich, Marly le Roi (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 404 days.

(21) Appl. No.: 12/752,122

(22) Filed: Apr. 1, 2010

(65) Prior Publication Data
US 2011/0242936 A1 Oct. 6, 2011

(51) Int. Cl.
*G01V 1/00* (2006.01)
*G01V 1/50* (2006.01)

(52) U.S. Cl.
CPC ........................................ *G01V 1/50* (2013.01)

(58) Field of Classification Search
CPC ...................................................... G01V 1/50
USPC .......................................... 367/25, 28–30, 88
See application file for complete search history.

(56) References Cited

U.S. PATENT DOCUMENTS

| | | | |
|---|---|---|---|
| 3,474,879 A * | 10/1969 | Adair | 181/104 |
| 4,683,557 A | 7/1987 | Willis | |
| 4,837,753 A | 6/1989 | Morris et al. | |
| 4,888,740 A * | 12/1989 | Brie et al. | 367/30 |
| 5,144,590 A | 9/1992 | Chon | |
| 6,205,087 B1 | 3/2001 | Fukuhara et al. | |
| 6,308,137 B1 | 10/2001 | Underhill et al. | |
| 7,813,219 B2 * | 10/2010 | Dubinsky et al. | 367/31 |
| 2008/0151690 A1 * | 6/2008 | Tang et al. | 367/35 |
| 2009/0236145 A1 | 9/2009 | Bennett et al. | |

FOREIGN PATENT DOCUMENTS

GB  2262340 A  6/1993

OTHER PUBLICATIONS

P. Breton et al., "Well Positioned Seismic Measurements," Oilfield Review, pp. 32-45, Spring, 2002.
Office action for the equivalent Japanese patent application No. 2011-093468 issued on Dec. 1, 2014.

* cited by examiner

*Primary Examiner* — Krystine Breier
(74) *Attorney, Agent, or Firm* — Daryl R. Wright; Wesley Noah

(57) ABSTRACT

Methods and apparatus to identify layer boundaries in subterranean formations are described. An example method of identifying a layer boundary of a subterranean formation includes transmitting an acoustic signal from a transmitter into a borehole of the subterranean formation and receiving the acoustic signal at a receiver coupled to the downhole tool and spaced from the transmitter. Additionally, the example method includes logging an energy value associated with the acoustic signal received by the receiver as the downhole tool is moved in the borehole and identifying a change in the logged energy value associated with an impedance change in the subterranean formation to identify the layer boundary.

20 Claims, 16 Drawing Sheets

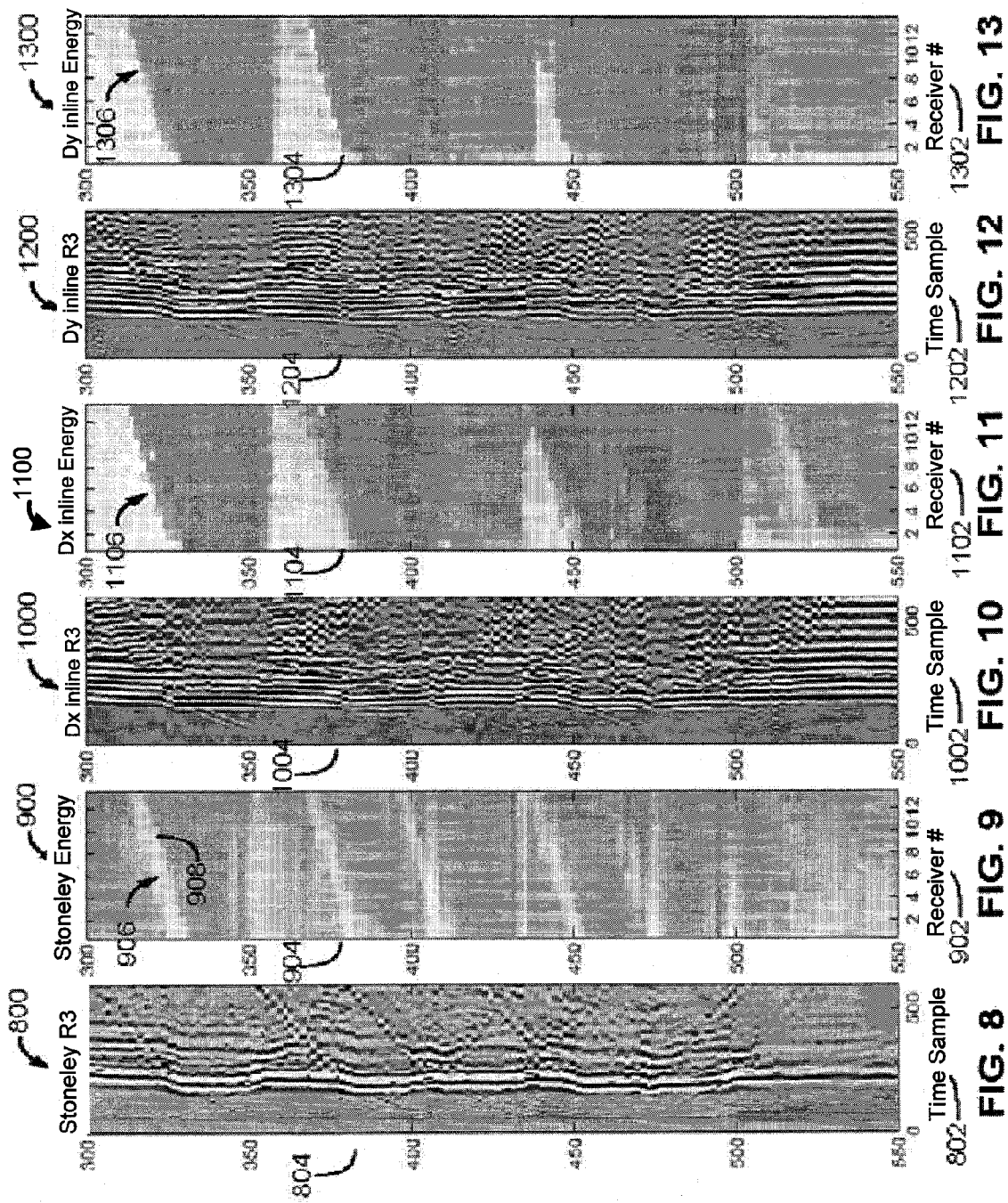

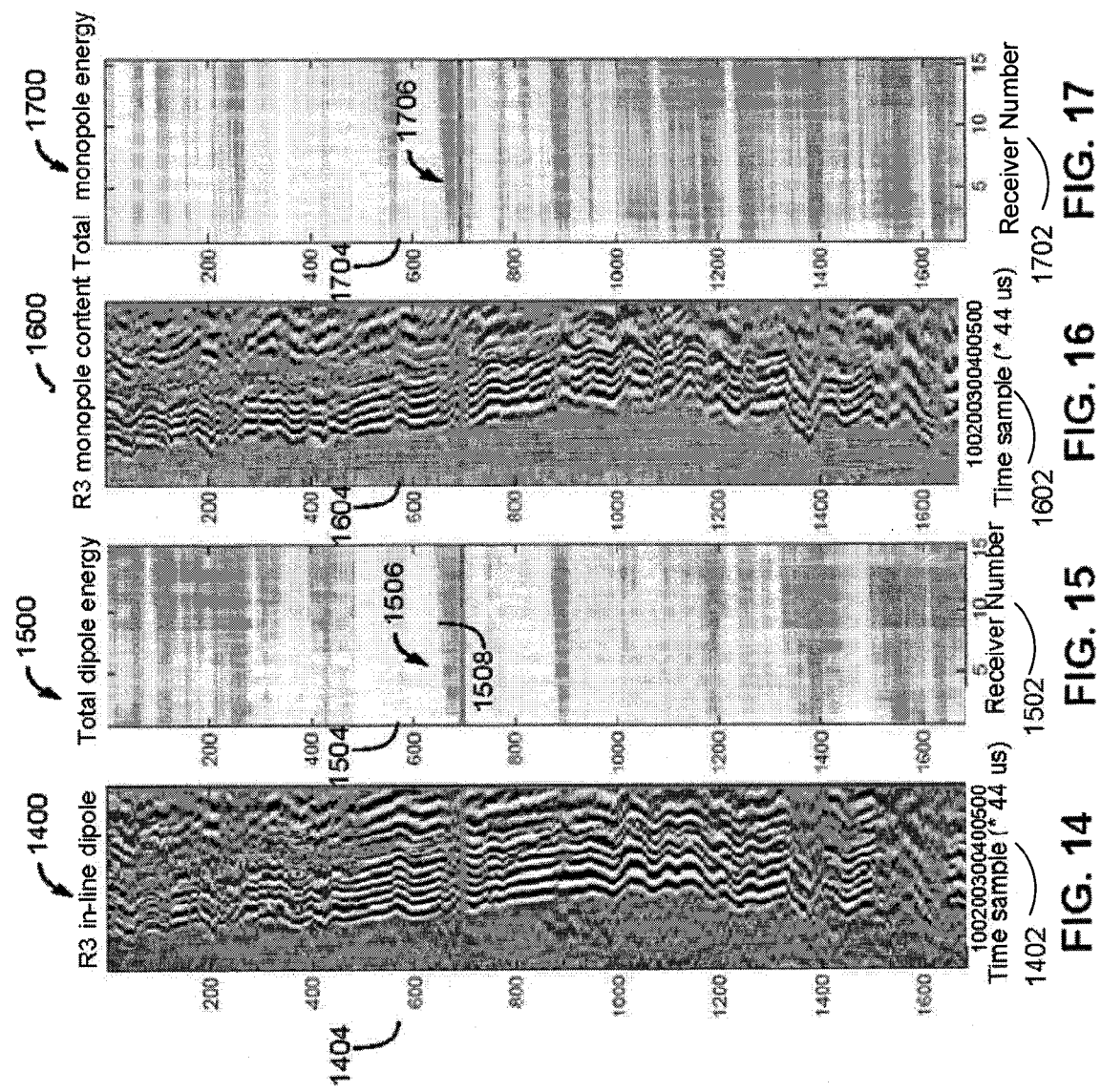

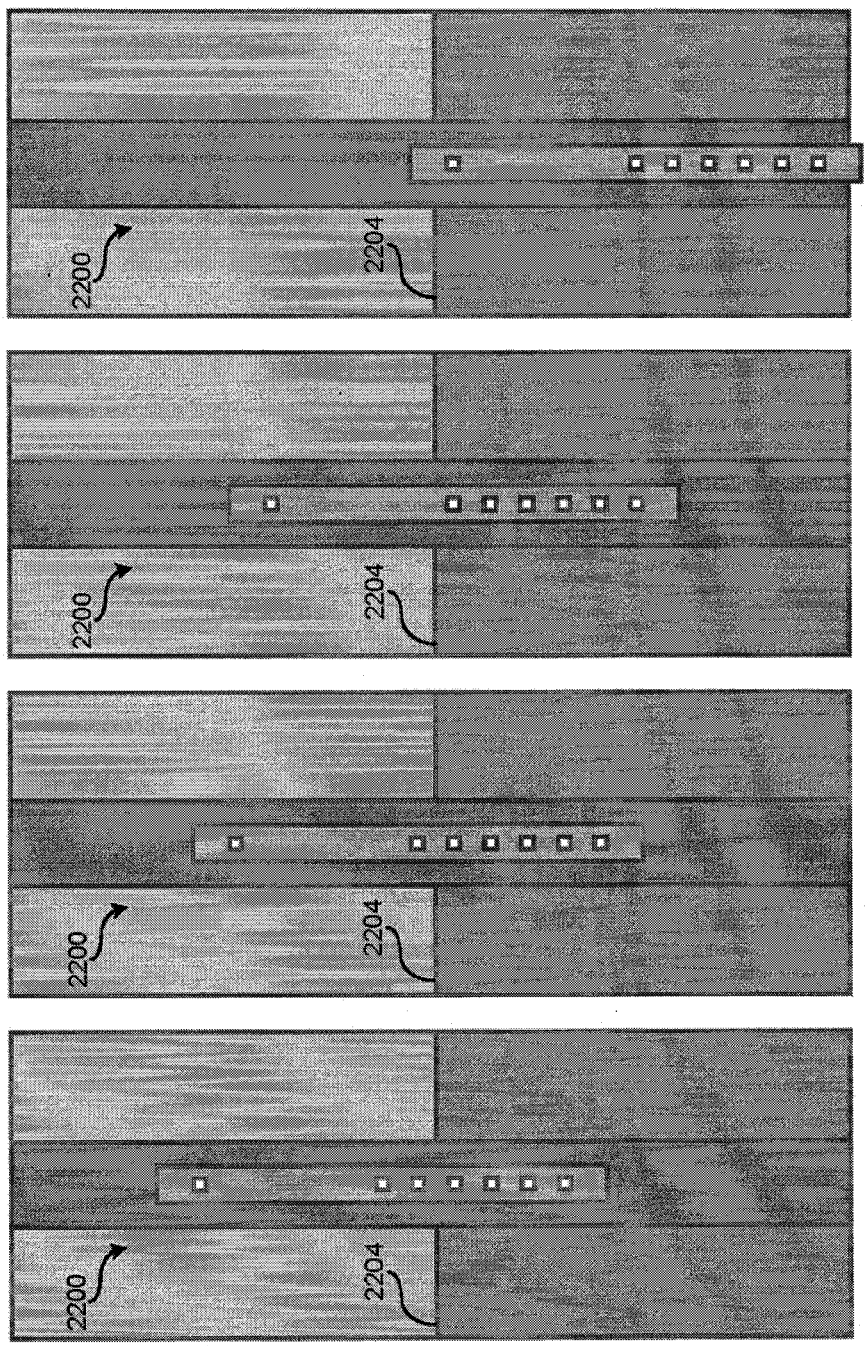

METHODS AND APPARATUS TO IDENTIFY LAYER BOUNDARIES IN SUBTERRANEAN FORMATIONS

FIELD OF THE DISCLOSURE

This patent relates generally to formation analysis and, more particularly, to methods and apparatus to identify layer boundaries in subterranean formations.

BACKGROUND

During sampling and/or drilling operations, sonic measurements may be obtained using a wireline tool to radially image the formation, for example. The radial imaging may be used to obtain a better understanding of the formation. However, in some instances, the radial imaging may be improperly interpreted because portions of the formation are inaccurately identified.

SUMMARY

An example method of identifying a layer boundary of a subterranean formation includes transmitting an acoustic signal from a transmitter into a borehole of the subterranean formation and receiving the acoustic signal at a receiver coupled to the downhole tool and spaced from the transmitter. Additionally, the example method includes logging an energy value associated with the acoustic signal received by the receiver as the downhole tool is moved in the borehole and identifying a change in the logged energy value associated with an impedance change in the subterranean formation to identify the layer boundary.

An example method of identifying a layer boundary of a subterranean formation includes transmitting an acoustic signal in a borehole of the subterranean formation and receiving the acoustic signal at a plurality of receivers coupled to the downhole tool and spaced from the transmitter. Additionally, the example method includes calculating transit times of the acoustic signal for each of the receivers and identifying a variation in the calculated transit times to identify the layer boundary.

BRIEF DESCRIPTION OF THE DRAWINGS

FIGS. 8-17 depict results obtained using the examples described herein.

FIGS. 22-29 depict different positions of an apparatus in a borehole.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The example methods and apparatus described herein can be used to identify layer boundaries and/or acoustic impedance contrasts in a subterranean formation as a tool traverses a borehole. Such an approach of identifying layer boundaries and/or acoustic impedance contrasts may advantageously enable a better understanding of the formation being analyzed.

In some examples, the layer boundaries and/or acoustic impedance contrasts may be identified by transmitting an acoustic signal to one or more receivers and then producing a log of the energy values associated with an acoustic impedance of the formation. By reviewing the log, the presence and position of layer boundaries and/or acoustic impedance contrasts may be determined by identifying a change (e.g., a drop) in the energy values and then determining a location of the tool and/or the receiver when the change occurred. In other examples, by reviewing the log, the presence and position of layer boundaries and/or acoustic impedance contrasts may be determined by identifying a trend in the energy values of adjacent receivers.

In other examples, the layer boundaries and/or acoustic impedance contrasts may be identified by transmitting an acoustic signal to one or more receivers and then determining a transit time and/or the relative time delays of the acoustic signal(s) for each of the receivers. By inverting the received and associated data, the presence and position of layer boundaries and/or acoustic impedance contrasts may be determined. Specifically, by inverting the received and associated data (e.g., transit time, receiver spacing relative to the transmitter), the number of lines in the data may be identified, the number of slopes in the data may be identified and/or the number of points interconnecting the lines in the data may be identified. All or some of the foregoing identified information may be used to determine (e.g., automatically determine) the number of bed boundaries, an estimation of the velocity of the formation and/or to generate a bed boundary indicator, for example.

Figure 1A:
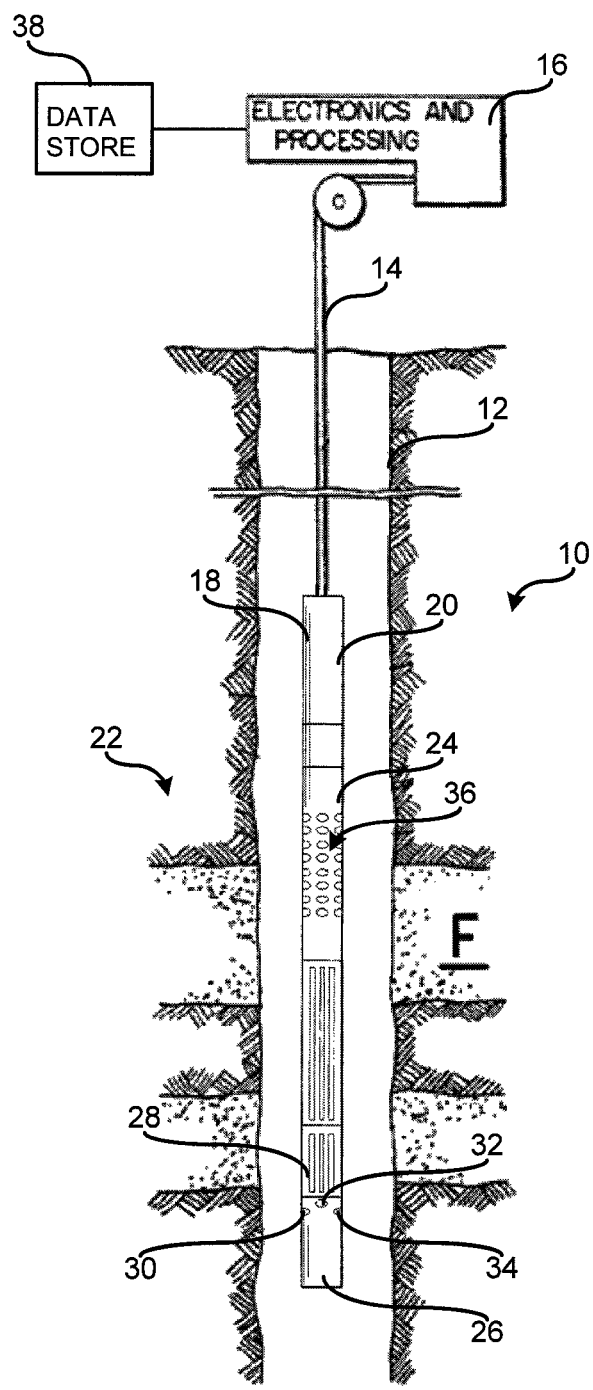
FIG. 1A depicts an example wireline tool.

FIG. 1A depicts an example wireline tool (e.g., a dipole sonic imaging tool) 10 in which the examples described herein can be employed. The example wireline tool 10 is suspended in a wellbore 12 from the lower end of a multiconductor cable 14 that is spooled on a winch (not shown) at the Earth's surface. At the surface, the cable 14 is communicatively coupled to an electronics and processing system 16. The example wireline tool 10 includes an elongated body 18 that includes a processing and telemetry cartridge 20 and an acoustic tool 22. The acoustic tool 22 includes a sonic receiver section 24 and a sonic transmitter section 26.

While the wireline tool 10 is tripped out of the wellbore 12, measurements may be obtained to determine characteristics of the formation F, for example. In some examples, such measurements may be obtained by the acoustic tool 22 and may be used to radially image the formation F. However, bed boundaries, fractures, layer boundaries or acoustic impedance contrasts that may be present in the formation F, if not identified, may adversely impact the interpretation of the radial imaging. Therefore, the example sonic transmitter section 26 may include one or more transmitters (e.g., a monopole transmitter, a dipole transmitter) 28, 30, 32 and 34 and the sonic receiver section 24 may include an array of receivers 36 coupled to the wireline tool 10 and spaced from the transmitters 28-34. As described in greater detail below, the transmitters 28-34 and the receivers 36 may be configured to identify such bed boundaries, fractures, layer boundaries and/or acoustic impedance contrasts. While not shown, the acoustic tool 22 may include any number of transmitters (e.g., 1, 2, 3, 4, etc.) that may be the same or different. For example, one of the transmitters 28-34 may be a monopole transmitter, another one of the transmitters 28-34 may be a dipole transmitter positioned along the x-axis of the wireline tool 10 and/or another one of the transmitters 28-34 may be a dipole transmitter positioned along the y-axis of the wireline tool 10, for example. Additionally, while not shown, the acoustic tool 22 may include any number of receivers (e.g., 1, 2, 3, 4, etc.) each of which may include a plurality of sensors (e.g., hydrophones). The sensors may be distributed (e.g., azimuthally distributed) around the periphery of the wireline tool 10. In some examples, each of the receivers may include eight sensors; however, each of the receivers may include any other number of sensors (e.g., 1, 2, 3, 4, etc.) instead.

As the wireline tool 10 is tripped out of the wellbore 12, measurements may be obtained to identify bed boundaries, fractures, layer boundaries and/or acoustic impedance contrasts by transmitting acoustic signals into the wellbore 12 via the transmitters 28-34. These acoustic signals may be received by the receivers 36. For the different acoustic signals transmitted, the receivers 36 may record or log information (e.g., the amplitude) associated with the acoustic signals in predetermined time intervals (e.g., every ten microseconds) over a time period (e.g., between about one to two milliseconds) at a given borehole depth, for example. In operation, as the receivers 36 receive the acoustic signals, the information associated with the acoustic signals may be transmitted to a data store 38 for storage.

The information associated with the transmission of acoustic signals stored in the data store 38 may be used by the electronics and processing system 16 and/or the processing and telemetry cartridge 20 to generate a log(s) of the energy content or values detected by the receivers 36 at different borehole depths as the wireline tool 10 is tripped out of or moved within the wellbore 12. The energy values may be associated with impedance (e.g., acoustic impedance) of the formation F. Different layers within the formation F may have different acoustic impedances. Therefore, a change (e.g., a decrease) in the energy values may be indicative of an acoustic impedance change because some of the energy may be reflected by the layer boundary and, thus, will not reach the receivers 36. A change in the energy values may indicate the presence of a layer boundary between the transmitters 28-34 and the receivers 36. In contrast, a constant energy value may indicate the absence of a layer boundary between the transmitters 28-34 and the receivers 36.

For example, if the transmitters 28-34 and the receivers 36 are positioned on the same side of a layer boundary, energy values associated with the acoustic signals received by the receivers 36 may remain relatively constant, be relatively high and/or exhibit small fluctuations. However, if the transmitters 28-34 and the receivers 36 are positioned on different sides of the layer boundary, energy values associated with the acoustic signals received by the receivers 36 may be relatively lower and/or decrease, because some of the energy may be reflected by the layer boundary and, thus, will not reach the receivers 36. In some examples, a substantial decrease in the energy value may be between about 20-40 decibels (dB). Additionally or alternatively, a substantial decrease in the energy value may be approximately a 3 dB change corresponding to approximately a 50% decrease in the energy value, for example. However, depending on the particular case and/or the well conditions, a substantial decrease in the energy value may be a different value.

In other examples, a log of the ratio of the energy values received by the receivers 36 may be generated from information obtained as the wireline tool 10 is tripped out of the wellbore 12. Differences in energy values between two adjacent borehole positions may indicate the presence of a layer boundary between the two positions. Therefore, if the energy values of two adjacent positions are approximately the same, then the ratio of these energy values will be approximately one, which indicates that no layer boundary likely exists between the two positions. However, if the energy values of two adjacent borehole positions are different, then the ratio of the energy values will not be one, which may indicate that a layer boundary exists between the two positions. If the wireline tool 10 includes multiple receivers 36, then the presence of a layer boundary may be identified by reviewing the energy content of the multiple receivers 36.

In other examples, the information associated with the transmission of acoustic signals stored in the data store 38 may be used by the electronics and processing system 16 and/or the processing and telemetry cartridge 20 to generate logs or plots of the relative time delays of the acoustic signal received by the receivers 36 as a function of the distance between the transmitters 28-34 and the receivers 36 at different borehole depths. If the receivers 36 are evenly spaced along the wireline tool 10, then a time interval or delay for an acoustic signal to travel between adjacent receivers 36 will be approximately the same. However, if a layer boundary is positioned between the adjacent receivers 36, then the time interval or delay for an acoustic signal to travel between adjacent receivers 36 will be different (e.g., the relative time delay for the receiver 36 on the other side of the layer boundary as the transmitter 28-34 will be substantially larger or increased). In some examples, a substantial increase in a transit time (e.g., relative transit time) for an acoustic signal to reach a given receiver may be a variation of several times the sampling rate. However, depending on the particular case and/or the well conditions, an increase in the transit time may be a different value.

Substantial changes and/or variations of the relative time delays of an acoustic signal between two adjacent borehole positions may be associated with a layer boundary between the two positions. To identify layer boundaries and/or to estimate the velocity of the formation, the received and associated data may be inverted using non-linear inversion, for example. By inverting the received and associated data, the number of lines in the data may be automatically identified, the number of slopes in the data may be automatically identified and/or the number of points interconnecting the lines in the data may be automatically identified. The number of points interconnecting the lines in the data may be associated with the number of layer boundaries in a portion of the formation F, for example.

If there is no layer boundary between two adjacent borehole positions, the relative time delay of an acoustic signal received by one of the receivers 36 may be similar to the relative time delay of the acoustic signal received by another one of the receivers 36. This similarity may be indicated by a relatively constant slope of the transit time of the acoustic signal as a function of the distance between the transmitter 28-34 and the receivers 36 if the received and associated data are plotted. However, if there is a layer boundary between two adjacent borehole positions, the relative time delay of an acoustic signal received by one of the receivers 36 may be different (e.g., lower) than the relative time delay of the acoustic signal received by another one of the receivers 36. This difference may be indicated by an inconsistent and/or a change in the slope of the transit time of the acoustic signal as a function of the distance between the transmitters 28-34 and the receivers 36 if the received and associated data are plotted.

Figure 1B:
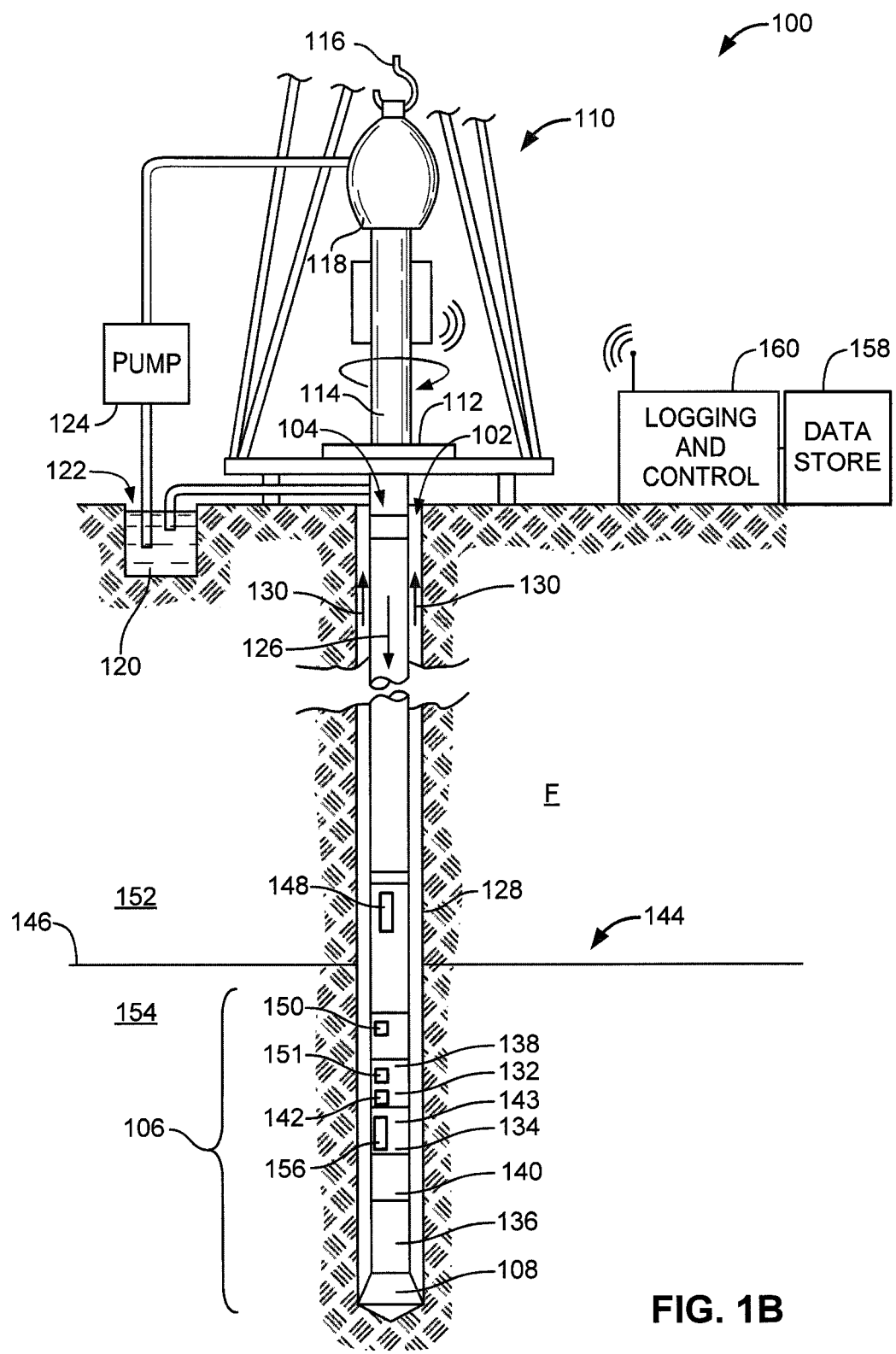
FIG. 1B depicts an example wellsite drilling system.

FIG. 1B illustrates a wellsite system 100 in which the examples described herein can be employed. The wellsite system 100 can be onshore or offshore. In this example, a borehole 102 is formed in a subsurface formation F by rotary drilling. However, other drilling methods (e.g., directional drilling) may also be used.

A drillstring 104 is suspended within the borehole 102 and has a bottomhole assembly 106 that includes a drill bit 108 at its lower end. At the surface, the wellsite system 100 includes a platform and derrick assembly 110 positioned over the borehole 102. The platform and derrick assembly 110 includes a rotary table 112, a kelly 114, a hook 116 and a rotary swivel 118. The rotary table 112 may engage the kelly 114 at an upper end of the drillstring 104 to impart rotation to the drillstring 104. The rotary table 112 may be energized by a device or system not shown. The drillstring 104 is suspended from the hook 116 that is attached to a traveling block (also not shown). Additionally, the drillstring 104 is positioned through the kelly 114 and the rotary swivel 118, which permits rotation of the drillstring 104 relative to the hook 116. Additionally or alternatively, a top drive system may be used to impart rotation to the drillstring 104.

In the example depicted in FIG. 1B, at the surface, the wellsite system 100 includes drilling fluid or mud 120 that may be stored in a pit 122 formed at the wellsite. A pump 124 delivers the drilling fluid 120 to the interior of the drillstring 104 via a port in the rotary swivel 118, causing the drilling fluid 120 to flow downwardly through the drillstring 104 as indicated by directional arrow 126. The drilling fluid 120 exits the drillstring 104 via ports in the drill bit 108, and then circulates upwardly through the annulus region between the outside of the drillstring 104 and a wall 128 of the borehole 102 as indicated by the directional arrows 130. The drilling fluid 120 lubricates the drill bit 108 and carries formation cuttings up to the surface as the drilling fluid 120 is returned to the pit 122 for recirculation.

The bottomhole assembly 106 of the example illustrated in FIG. 1B includes a logging-while-drilling (LWD) module 132, a measuring-while-drilling (MWD) module 134, another drillstring component 136 such as, a roto-steerable system or mud motor, and the drill bit 108.

The LWD module 132 may be housed in a drill collar 138 and may include one or more logging tools. In some examples, the bottomhole assembly 106 may include an additional LWD module and/or a MWD module as represented by reference numeral 140. As such, references throughout this description to reference numeral 132 may additionally or alternatively include reference numeral 140. The LWD module 132 may include capabilities for measuring, processing, and storing information, as well as for communicating with the surface equipment. Additionally or alternatively, the LWD module 132 may include a seismic measuring device 142.

The MWD module 134 may be also housed in a drill collar 143 and can include one or more devices for measuring characteristics of the drillstring 104 and/or the drill bit 108. Additionally or alternatively, the MWD module 134 may include an apparatus (not shown) for generating electrical power for at least portions of the bottomhole assembly 106, for example. The apparatus for generating electrical power may include a mud turbine generator powered by the flow of drilling fluid. However, other power and/or battery systems may additionally or alternatively be employed. The MWD module 134 may include one or more tools or measuring devices such as, for example, a weight-on-bit measuring device, a torque measuring device, a vibration measuring device, a shock measuring device, a stick slip measuring device, a direction measuring device and/or an inclination measuring device.

During a drilling operation, an example acoustic tool 144 may be used to obtain information to radially image the formation F, for example. However, bed boundaries, layer boundaries or acoustic impedance contrasts that may be present in the formation F, if not identified, may adversely impact the interpretation of the radial imaging. Therefore, the example acoustic tool 144 includes a transmitter 148 and first and second receivers 150 and 151 configured to identify a layer boundary 146 present in the formation F. In addition to identifying the layer boundary 146, the acoustic tool 144 may be used to identify characteristics of the layer boundary 146 such as the inclination of the layer boundary 146 or the thickness of the layer itself, for example. While the wellsite system 100 depicts the transmitter 148 and the receivers 150 and 151 downhole, the transmitter 148 may be positioned uphole and the receivers 150 and 151 may be positioned downhole, or the transmitter 148 may be positioned downhole and the receivers 150 and 151 may be positioned uphole, for example. Any number of transmitters (e.g., 1, 2, 3, 4, etc.) and/or receivers (e.g., 1, 2, 3, 4, etc.) may be used with the acoustic tool 144.

In some examples, to identify the layer boundary 146, the transmitter 148 may transmit an acoustic signal into the borehole 102. The acoustic signal is thereafter received by the first receiver 150 and/or the second receiver 151. For the different acoustic signals transmitted, the receivers 150 and/or 151 may record or log information (e.g., the amplitude) associated with the acoustic signal in predetermined time intervals over a time period at a given borehole depth, for example. This information along with any other associated information may be transmitted to a data store 156 and/or 158 for storage.

The information associated with the transmission of acoustic signals stored in the data store 156 and/or 158 may be used by a logging and control computer 160 to produce a log(s) of the amplitude of the acoustic signals received by the receivers 150 and/or 151 over a time period at different borehole depths. Additionally, the logging and control computer 160 may be used to generate a log of the energy values of the acoustic signals received by the receivers 150 and/or 151 over the time period at the different borehole depths. In some examples, the energy value at a particular borehole depth for a particular receiver 150 or 151 may be associated with the sum of the amplitudes of the acoustic signals received by the corresponding receiver 150 or 151 over a time period squared ($\Sigma A^2$) (e.g., the sum of the squared amplitudes over the entire trace). A decrease in the energy values may indicate the presence of the layer boundary 146 between the transmitter 148 and the receiver 150 and/or 151. Therefore, by reviewing the log associated with the energy values at the different borehole depths, the layer boundary 146 may be identified when the energy value drops and/or when the energy value is relatively low and/or by identifying a trend (e.g., a change) in the energy values between the receivers 150 and 151. In contrast, by reviewing the log associated with the energy values at the different borehole depths, the absence of the layer boundary 146 may be identified when the energy value is relatively constant and/or is relatively high.

For example, if both the transmitter 148 and the first receiver 150 are positioned on a first side 152 of the layer boundary 146 (e.g., the layer boundary 146 is not positioned between the transmitter 148 and the first receiver 150), energy values associated with acoustic signals received by the first receiver 150 may remain relatively constant, remain relatively high and/or increase, because the acoustic impedance of the formation F may be relatively consistent or constant. However, if the transmitter 148 is positioned on the first side 152 of the layer boundary 146 and the first receiver 150 is positioned on a second side 154 of the layer boundary 146 (e.g., the layer boundary 146 is positioned between the transmitter 148 and the first receiver 150), energy values associated with acoustic signals received by the first receiver 150 may be relatively low and/or decrease. These energy values may decrease because the first side 152 may be associated with a first acoustic impedance and the second side 154 may be associated with a second acoustic impedance and because some of the signal energy may be reflected at the layer boundary 146 and, thus, this reflected energy may not reach the first receiver 150.

In other examples, a log of the ratio of the energy values received by the first receiver 150 and the second receiver 151 may be generated. Because differences in the energy values associated with adjacent borehole positions may indicate the presence of the layer boundary 146, the layer boundary 146 may be identified if a ratio of the energy values associated with adjacent positions is not one or close to one.

In other examples, the log(s) of the amplitude of the acoustic signals received by the receivers 150 and/or 151 over a time period at different borehole depths may be used by the logging and control computer 160 to identify changes in the relative time delays of the acoustic signal(s) received by the receivers 150 and/or 151. A change in the relative time delay of an acoustic signal received by the first receiver 150 and then by the second receiver 151 may indicate the presence of the layer boundary 146 between the receivers 150 and 151. Additionally or alternatively, changes in the relative time delays of acoustic signals received by the receivers 150 and/or 151 between two adjacent borehole positions may be associated with the layer boundary 146 being positioned between the two positions.

For example, if the layer boundary 146 is positioned between the first receiver 150 and the second receiver 151, the relative time delay of an acoustic signal received by the first receiver 150 may be different than the relative time delay of the acoustic signal received by the second receiver 151. This relative time delay difference may be represented by a change in the slope of the transit time of the acoustic signal as a function of the distance between the transmitter 148 and the corresponding receiver 150 or 151 if the received and associated data are plotted. In contrast, if the layer boundary 146 is not positioned between the first receiver 150 and the second receiver 151, the relative time delay of an acoustic signal received by the first receiver 150 may be substantially similar to the relative time delay of the acoustic signal received by the second receiver 151. This similarity may be represented by a relatively constant slope of the transit time of the acoustic signal as a function of the distance between the transmitter 148 and the corresponding receiver 150 or 151 if the received and associated data are plotted.

The logging and control computer 160 may receive information and/or data transmitted from the LWD module 132, the seismic measuring device 142, the MWD module 134 and/or the acoustic tool 144. The logging and control computer 160 may analyze results obtained while drilling and/or while drilling is temporarily suspended, for example. The logging and control computer 160 may include a user interface that enables parameters (e.g., processing parameters) to be input and/or outputs to be displayed. While the logging and control computer 160 is depicted uphole and adjacent the wellsite system, a portion or the entire logging and control computer 160 may be positioned in the drillstring 104, the bottomhole assembly 106 and/or in a remote location.

Although the components of FIGS. 1A and 1B are shown and described as being implemented in a particular conveyance type, the example methods and apparatus described herein are not limited to a particular conveyance type but, instead, may be implemented in connection with different conveyance types including, for example, coiled tubing, wired drillpipe, and/or any other conveyance types known in the industry.

Figure 2:
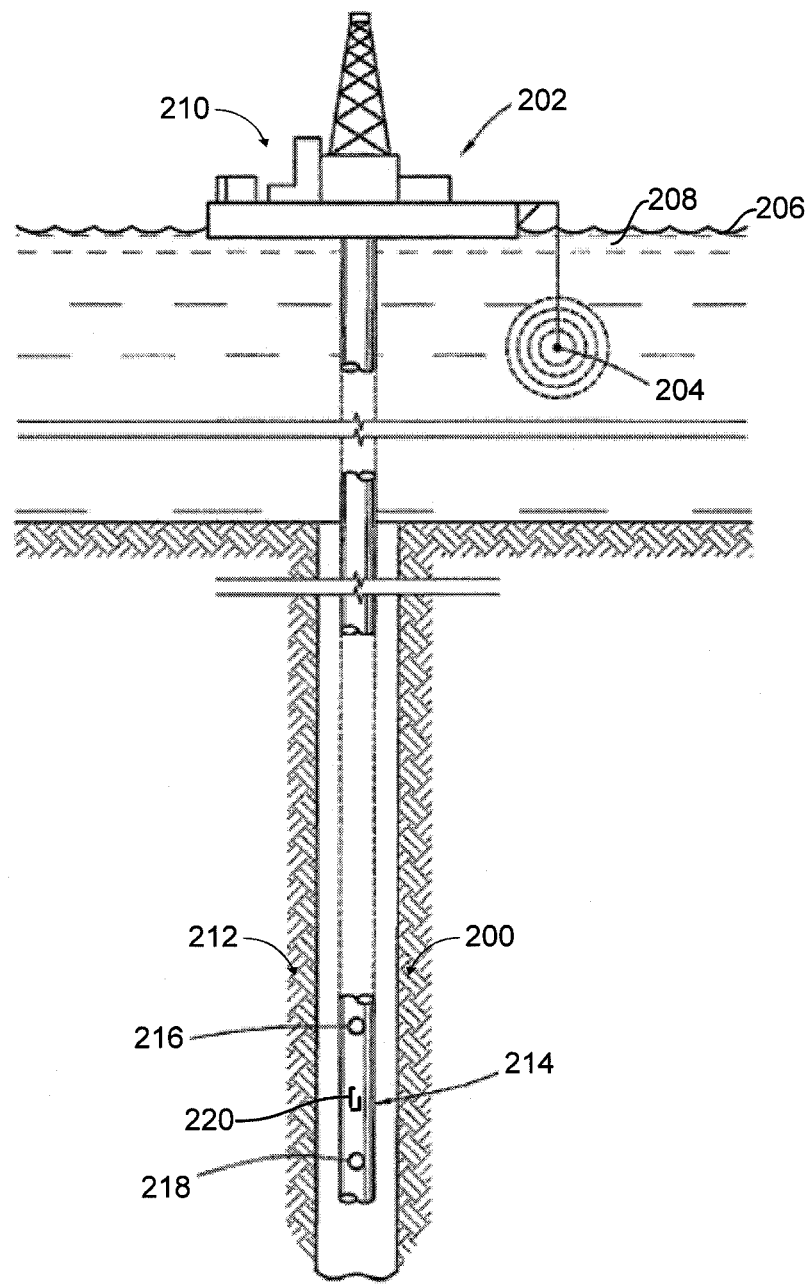
FIG. 2 depicts an example sonic logging-while-drilling tool.

FIG. 2 depicts a sonic logging-while-drilling tool 200 that may be used to implement at least a part of the LWD module 132 of FIG. 1B or which may be part of the LWD module 140 as described in U.S. Pat. No. 6,308,137, which is hereby incorporated herein by reference in its entirety. An offshore rig 202 having a sonic transmitting source or array or transmitter 204 may be deployed near a surface 206 of water 208. Additionally or alternatively, any other type of uphole or downhole source or transmitter may be provided to transmit sonic signals. In some examples, an uphole processor (not shown) may control the firing of the transmitter 204.

Uphole equipment 210 may also include acoustic receivers (not shown) and a recorder (not shown) for capturing reference signals near the source of the signals (e.g., the transmitter 204). The uphole equipment 210 may also include telemetry equipment (not shown) for receiving MWD signals from downhole equipment 212. The telemetry equipment and the recorder are typically coupled to a processor (not shown) so that recordings may be synchronized using uphole and downhole clocks (not shown). In this example, a downhole LWD module 214 includes one or more acoustic receivers 216 and 218. The acoustic receivers 216 and 218 are typically coupled to a signal processor 220 so that recordings may be made of signals detected by the receiver(s) 216 and/or 218 in synchronization with the firing of the signal source (e.g., the transmitter 204).

Figure 4:
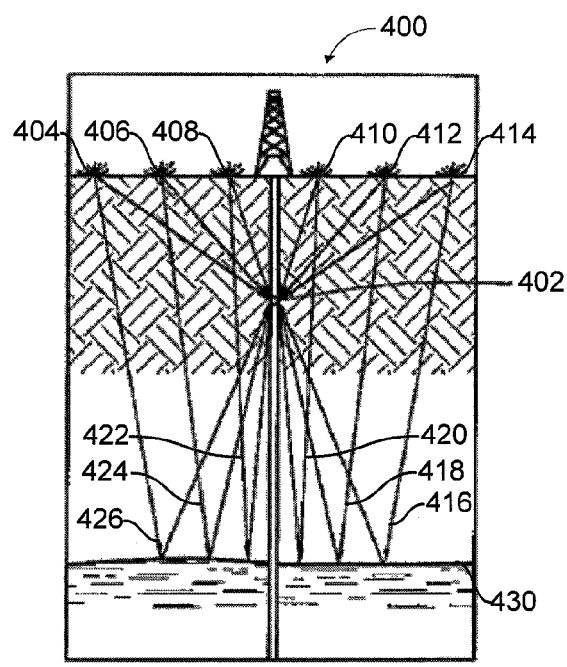
Figure 5:
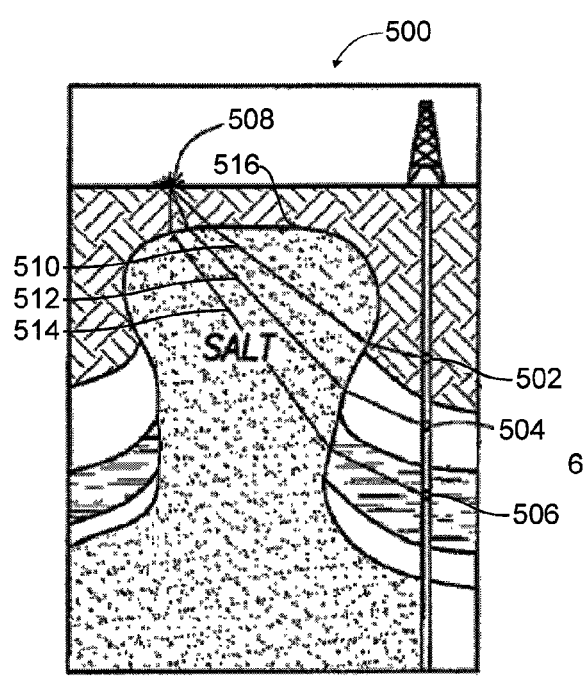
Figure 6:
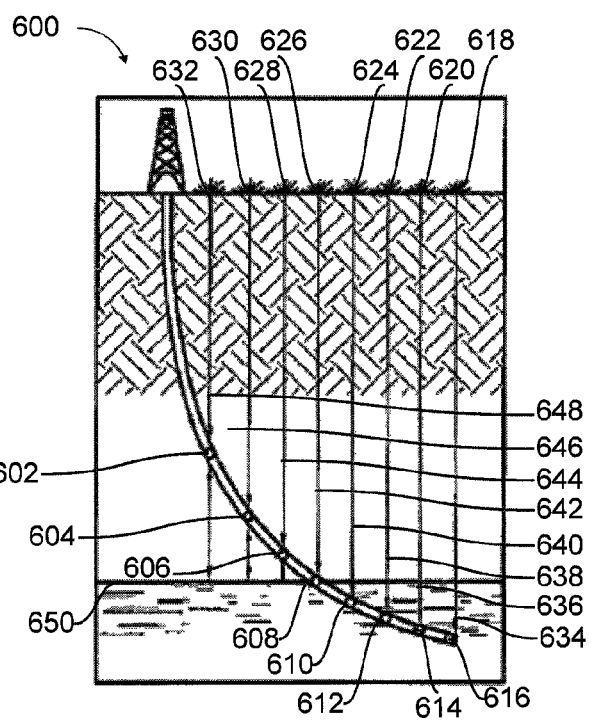

FIGS. 3-6 illustrate seismic-while-drilling tools 300, 400, 500 and/or 600 that may be used to implement at least a part of the LWD module 132 of FIG. 1B or may be part of the LWD module 140 as described in P. Breton et al., "Well Positioned Seismic Measurements," Oilfield Review, pp. 32-45, Spring, 2002, which is hereby incorporated herein by reference in its entirety. The seismic-while-drilling tools 300, 400, 500 and 600 may include a single receiver 302 (FIG. 3) and 402 (FIG. 4) or a plurality of receivers 502-506 (FIG. 5), 602-616 (FIG. 6) that may be employed in conjunction with a single seismic source or transmitter 304 (FIG. 3), 508 (FIG. 5) or a plurality of seismic sources or transmitters 404-414 (FIG. 4) or 618-632 (FIG. 6).

Figure 3:
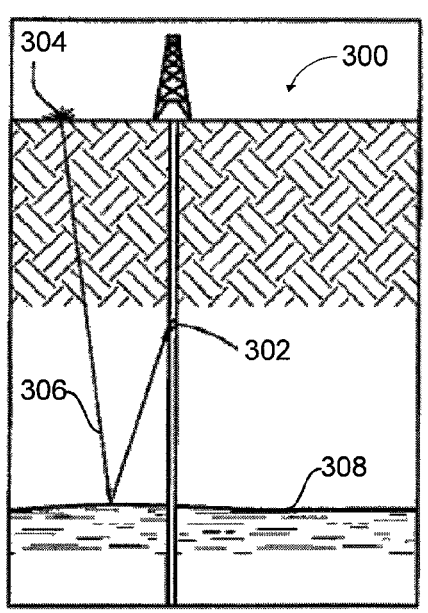
FIGS. 3-6 depict sonic while drilling tools having one or more seismic sources and one or more receivers.

FIG. 3 depicts a signal 306 reflecting off of a bed boundary 308 and may be referred to as a "zero-offset" vertical seismic profile arrangement. FIG. 4 depicts signals 416-426 reflecting off of a bed boundary 430 and may be referred to as a "walkaway" vertical seismic profile arrangement. FIG. 5 depicts signals 510-514 refracting through salt dome boundaries 516 and may be referred to as "salt proximity" vertical seismic profile. FIG. 6 depicts signals 634-648 some of which are reflecting off of a bed boundary 650 and may be referred to as "walk above" vertical seismic profile.

Figure 7:
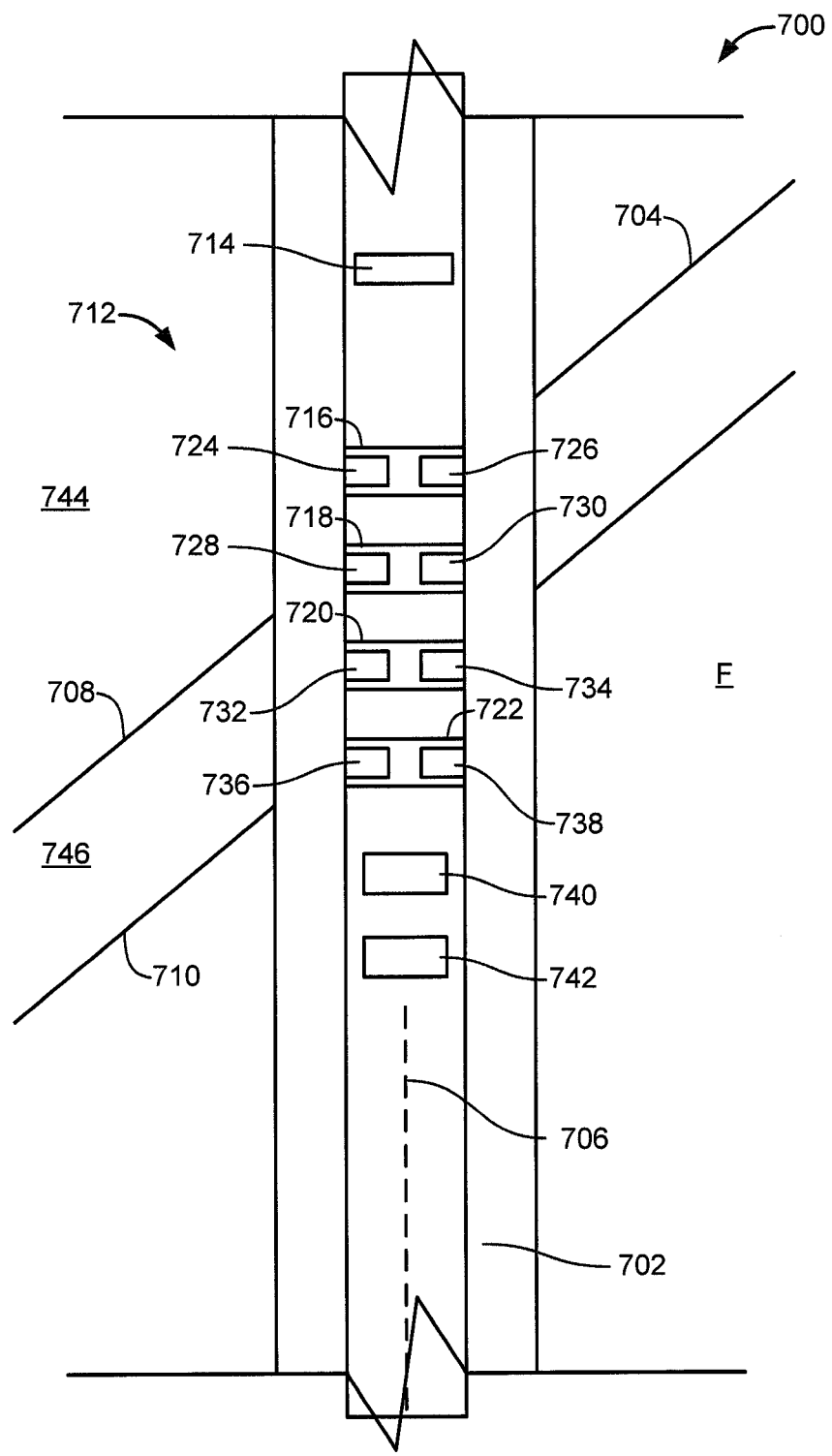
FIG. 7 depicts an example apparatus that may used to implement the examples described herein.

FIG. 7 depicts an example apparatus 700 positioned in a borehole 702 formed in a formation F having a layer 704. The layer 704 has an inclination (e.g., is positioned at a nonperpendicular angle) relative to a longitudinal axis 706 of the borehole 702 and includes a first layer boundary 708 and a second layer boundary 710.

To identify characteristics of the layer 704 and/or the layer boundaries 708 and/or 710, the example apparatus 700 is provided with an acoustic tool 712 having a transmitter 714 and first through fourth receivers 716-722. In this example, each of the receivers 716-722 is provided with first and second opposing sensors (e.g., hydrophones) 724-738. However, each of the receivers 716-722 may include any number of sensors such as eight sensors, for example. While this example depicts the example apparatus 700 having one transmitter 714 and four receivers 716-722, the example apparatus 700 may include any number of transmitters (e.g., 1, 2, 3, etc.) and/or any number or receivers (e.g., 1, 2, 3, etc.).

In some examples, to identify the layer 704 and/or the layer boundaries 708 and/or 710, the transmitter 714 may transmit an acoustic signal into the borehole 702. The acoustic signal may thereafter be received by the sensors 724-738 of the corresponding receivers 716-722. For the different acoustic signals transmitted, the sensors 724-738 may record or log information (e.g., signal amplitude) associated with the acoustic signal in predetermined time intervals over a time period at a given borehole depth, for example. This information along with any other associated information may be transmitted to a data store 740 for storage.

The information associated with the transmission of the acoustic signals stored in the data store 740 may be used by a processor 742 to produce a log(s) of the amplitude of the acoustic signals received by the sensors 724-738 over a time period at different borehole depths. Additionally, the processor 742 may be used to generate a log(s) of the energy values of the acoustic signals received by the sensors 724-738 over the time period at the different borehole depths as the apparatus 700 is moved in the borehole 702, for example. A decrease in the energy values may indicate the inclination of and/or the presence of one of the layer boundaries 708 and/or 710 and/or an acoustic impedance change in the formation F between the transmitter 714 and the corresponding sensors 724-738. The decrease in energy values may result from some of the energy of the acoustic signal being reflected at the layer boundary 708 and/or 710. For example, if the example apparatus 700 is a wireline tool that is being tripped out of the borehole 702, the log associated with the energy values may be reviewed to identify a difference in the energy values associated with the first and second opposing sensors 724 and 726, for example, which may be indicative of an inclination of the first layer boundary 708. Specifically, as depicted in FIG. 7, because both the transmitter 714 and the first sensor 724 are positioned on a first side 744 of the first layer boundary 708 having a first acoustic impedance, an energy value associated with an acoustic signal received by the first sensor 724 may be relatively high. However, because the second sensor 726 is positioned on a second side 746 of the first layer boundary 708 having a second acoustic impedance and the transmitter 714 is positioned on the first side 744 of the first layer boundary 708 having the first acoustic impedance, an energy value associated with the acoustic signal received by the second sensor 726 may be relatively lower, because some of the energy of the acoustic signal may be reflected at the first layer boundary 708.

In other examples, the log(s) of the amplitude of the acoustic signals received by the sensors 724-738 over a time period at different borehole depths may be used by the processor 742 to identify changes in the relative time delays of the acoustic signal(s) received by the sensors 724-738. A change in the relative time delays of an acoustic signal received by the sensors 724-738 may indicate the inclination of and/or the presence of one of the layer boundaries 708 and/or 710 and/or an acoustic impedance change in the formation F between the transmitter 714 and the corresponding sensors 724-738. For example, if the example apparatus 700 is a wireline tool that is being tripped out of the borehole 702, by inverting the data associated with an acoustic signal(s) as received by the respective sensors 724-738, the inclination of the first layer boundary 708 may be identified by a change in the relative time delays of an acoustic signal as received by the first and second opposing sensors 724 and 726, for example. Specifically, as depicted in FIG. 7, because both the transmitter 714 and the first sensor 724 are positioned on the first side 744 of the first layer boundary 708 having the first acoustic impedance, an acoustic signal may have a first relative time delay when received by the first sensor 724. However, because the second sensor 726 is positioned on the second side 746 of the first layer boundary 708 having the second acoustic impedance and the transmitter 714 is positioned on the first side 744 of the first layer boundary 708 having the first acoustic impedance, the acoustic signal may have a second relative time delay different than the first relative time delay when received by the second sensor 726.

Figure 30:
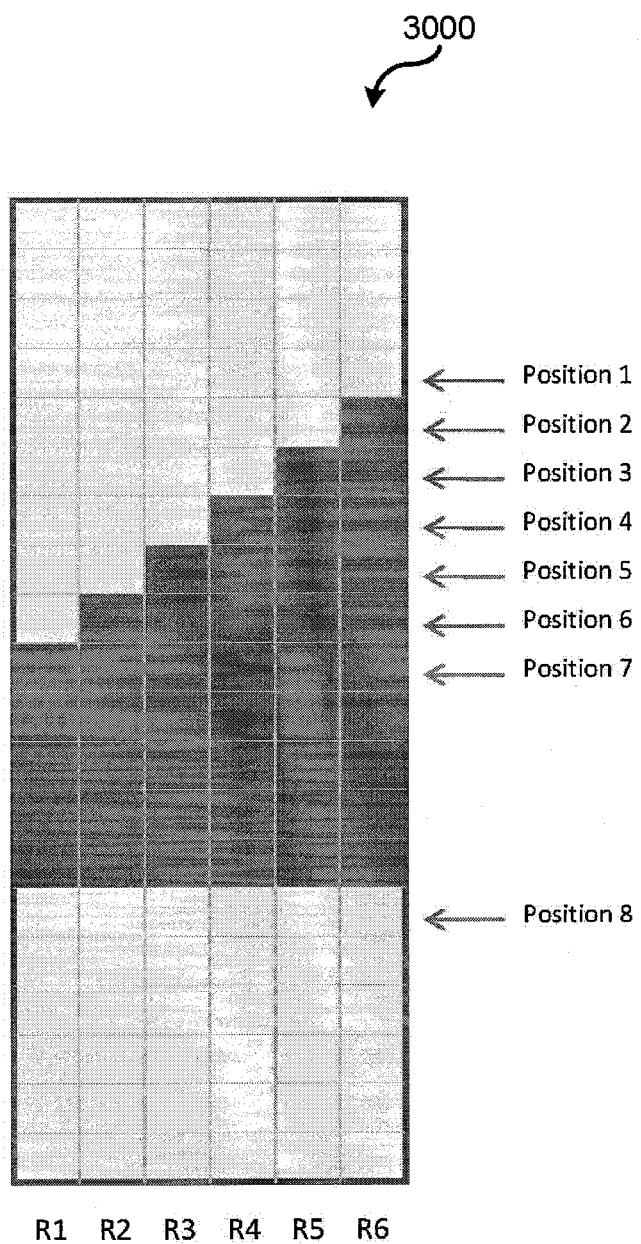
FIG. 30 depicts energy values received in the different positions by receivers of the apparatus of FIGS. 22-29.

FIGS. 22-29 depict different positions of a tool 2200 in a borehole 2202 relative to a layer boundary 2204. The tool 2200 includes a transmitter 2206 and first through sixth receivers 2208-2218. FIG. 30 depicts a plot 3000 of the energy values received by the receivers 2208-2218 in the different positions within the borehole 2202. R1-R6 of the plot 3000 corresponds to the respective receivers 2208-2218 and positions 1-8 correspond to the positions of the tool 2200 in FIGS. 22-29, respectively.

Figures 22, 23, 24, 25:
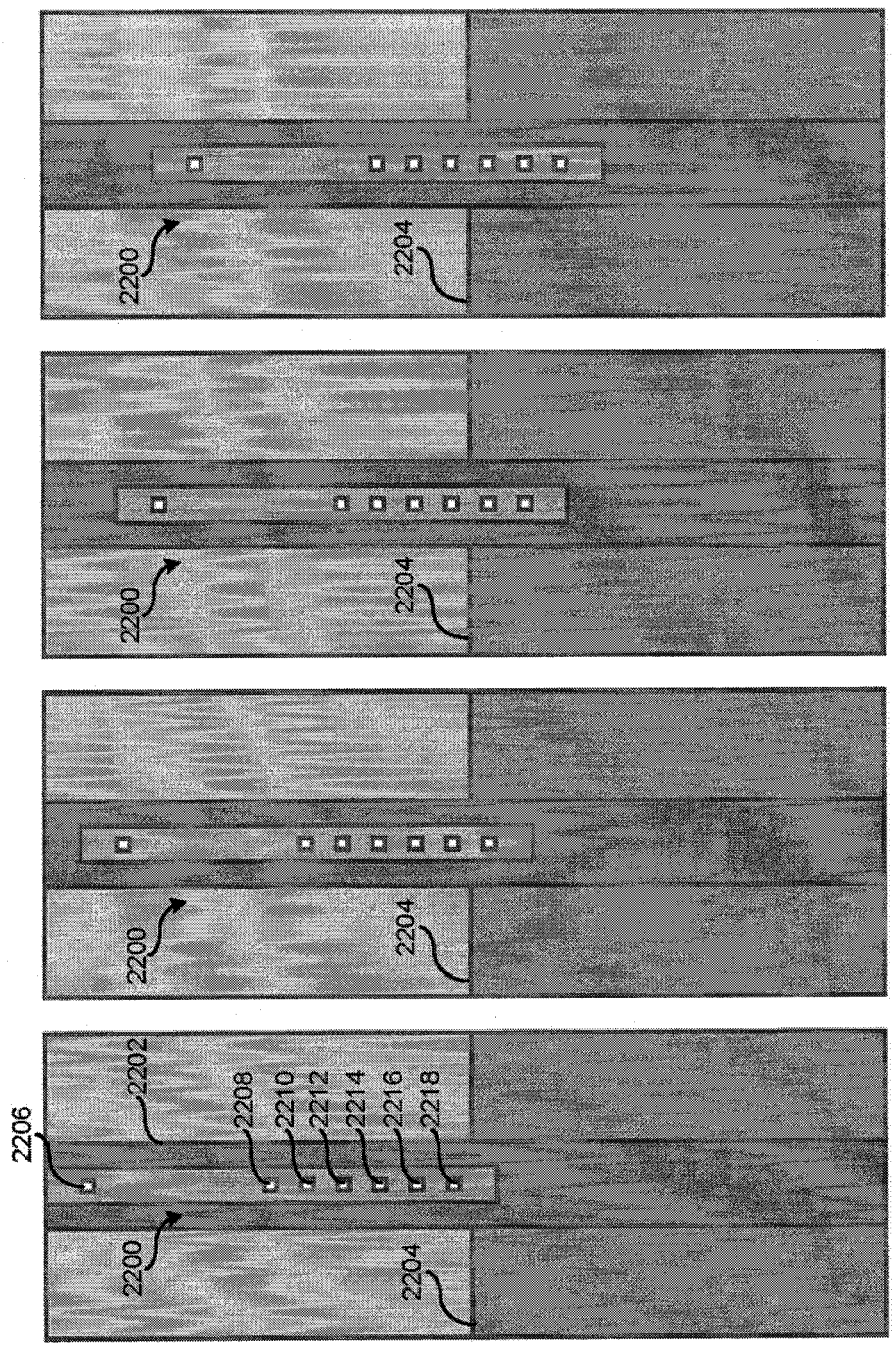

As discussed above, the transmitter 2206 may transmit an acoustic signal into the borehole 2202 which is thereafter be received by the receivers 2208-2218. If all of the receivers 2208-2218 are initially positioned on the same side of the layer boundary 2204 as the transmitter 2206, as depicted in FIG. 22, the energy values received by the receivers 2208-2218 will all be substantially the same (position 1 of FIG. 30). However, as the receivers 2208-2218 move to be on different sides of the layer boundary 2204 as the transmitter 2206, as depicted in FIGS. 23-28, the energy values received by the receivers 2208-2218 will be different depending on the position of the respective receiver 2208-2218 relative to the transmitter 2206 and the layer boundary 2204 (positions 2-7 of FIG. 30). When all of the receivers 2208-2218 are again positioned on the same side of the layer boundary 2204 as the transmitter 2206, as depicted in FIG. 29, the energy values received by the receivers 2208-2218 will all be substantially the same (position 8 of FIG. 30).

FIGS. 8-13 depict results obtained and/or generated using the examples described herein in connection with a wireline tool having three transmitters and fourteen receivers. The first transmitter may be a monopole transmitter, the second transmitter may be a dipole transmitter positioned along the x-axis of the wireline tool and the third transmitter may be a dipole transmitter positioned along the y-axis of the wireline tool. The first receiver is relatively closer and/or closest to the transmitters and the fourteenth receiver is relatively farther and/or farthest from the transmitters. Each of the receivers includes eight sensors axially positioned around the wireline tool, for example.

FIG. 8 depicts a log or column 800 of the amplitude of acoustic signals transmitted by a monopole transmitter and received by a receiver (e.g., the third receiver) in predetermined time intervals over a time period. The x-axis 802 is associated with time and the y-axis 804 is associated with the position (e.g., vertical depth) of the wireline tool within the borehole. Darker portions of the column 800 correspond to negative amplitude and lighter portions of the column 800 correspond to positive amplitude.

FIG. 9 depicts a log or column 900 of the energy content associated with the amplitude of the acoustic signals of FIG. 8 received by the fourteen receivers over the time period. The x-axis 902 is associated with the respective receiver and the y-axis 904 is associated with the position (e.g., the vertical depth) of the wireline tool within the borehole. In this example, the energy value at a particular borehole depth is associated with the sum of the amplitudes of the acoustic signals received by the corresponding receiver over the time period squared ($\Sigma A^2$) (e.g., sum of the squared amplitudes over the entire trace). Darker portions of the column 900 correspond to lower energy values and, thus, may indicate the presence of a layer boundary between the transmitter the corresponding receiver at the given borehole depth. Lighter portions of the column 900 correspond to higher energy values and, thus, may indicate the absence of a layer boundary between the transmitter and the corresponding receiver at the given borehole depth. For example, the area represented by reference number 906 may indicate the presence of a layer boundary because of the sharp contrast between light and dark. The angle of the darker and lighter portions represented by reference number 908 is present because the first receiver is positioned closest to the transmitter and the fourteenth receiver is positioned farthest from the transmitter. Therefore, as the wireline tool is tripped out of the borehole and across the layer boundary, the first receiver will be first to be on the same side of the layer boundary as the transmitter and the fourteenth receiver will be last to be on the same side of the layer boundary as the transmitter.

FIG. 10 depicts a log or column 1000 of the amplitude of acoustic signals transmitted by a dipole transmitter positioned along the x-axis of the wireline tool as received by a receiver (e.g., the third receiver) in predetermined time intervals over a time period. The x-axis 1002 is associated with time and the y-axis 1004 is associated with the position (e.g., vertical depth) of the wireline tool within the borehole. Because the dipole transmitter is positioned along the x-axis of the wireline tool, the value of the amplitude received by the sensors of the respective receivers is weighted. Specifically, the sensors positioned along the positive and negative x-directions are weighted with a value of positive and negative one respectively, the sensors positioned along the positive and negative forty five degree angles relative to the x-axis are weighted with a value of the square root of two divided by two ($\sqrt{2}/2$), the sensors positioned along the positive and negative one hundred and thirty five degree angles relative to the x-axis are weighted with a value of negative square root of two divided by two ($\sqrt{2}/2$) and the sensors positioned along the positive and negative y-directions are weighted zero. Darker portions of the column 1000 correspond to negative amplitude and lighter portions of the column 1000 correspond to positive amplitude.

FIG. 11 depicts a log or column 1100 of the energy content associated with the amplitude of the acoustic signals of FIG. 10 received by the fourteen receivers over the time period. The x-axis 1102 is associated with the respective receiver and the y-axis 1104 is associated with the position (e.g., the vertical depth) of the wireline tool within the borehole. Darker portions of the column 1100 correspond to lower energy values and, thus, may indicate the presence of a layer boundary between the transmitter and the corresponding receiver at the given borehole depth. Lighter portions of the column 1100 correspond to higher energy values and, thus, may indicate the absence of a layer boundary between the transmitter and the corresponding receiver at the given borehole depth. For example, the area represented by reference number 1106 may indicate the presence of a layer boundary because of the sharp contrast between light and dark.

FIG. 12 depicts a log or column 1200 of the amplitude of acoustic signals transmitted by a dipole transmitter positioned along the y-axis of the wireline tool as received by a receiver in predetermined time intervals over a time period. The x-axis 1202 is associated with time and the y-axis 1204 is associated with the position (e.g., vertical depth) of the wireline tool within the borehole. Because the dipole transmitter is positioned along the y-axis of the wireline tool, the value of the amplitude received by the sensors of the respective receivers is weighted. Specifically, the sensors positioned along the positive and negative y-directions are weighted with a value of positive and negative one respectively, the sensors positioned along the positive and negative forty five degree angles relative to the y-axis are weighted with a value of $\sqrt{2}/2$, the sensors positioned along the positive and negative one hundred and thirty five degree angles relative to the x-axis are weighted with a value of negative $\sqrt{2}/2$ and the sensors positioned along the positive and negative x-directions are weighted zero. Darker portions of the column 1200 correspond to negative amplitude and lighter portions of the column 1200 correspond to positive amplitude.

FIG. 13 depicts a log or column 1300 of the energy content associated with the amplitude of the acoustic signals of FIG. 12 received by the fourteen receivers over the time period. The x-axis 1302 is associated with the respective receivers and the y-axis 1304 is associated with the position (e.g., the vertical depth) of the wireline tool within the borehole. Darker portions of the column 1300 correspond to lower energy values and, thus, may indicate the presence of a layer boundary between the transmitter and the corresponding receiver at the given borehole depth. Lighter portions of the column 1300 correspond to higher energy values and, thus, may indicate the absence of a layer boundary between the transmitter and the corresponding receiver at the given borehole depth. For example, the area represented by reference number 1306 may indicate the presence of a layer boundary because of the sharp contrast between light and dark.

FIGS. 14-17 depict results obtained and/or generated using the examples described herein using a wireline tool having fifteen receivers and a transmitter. The transmitter is capable of functioning as at least one monopole transmitter and at least one dipole transmitter. The first receiver is relatively closer and/or closest to the transmitter and the fifteenth receiver is relatively farther or farthest from the transmitter. Each of the receivers includes eight sensors axially positioned around the wireline tool, for example.

FIG. 14 depicts a log or column 1400 of the in-line dipole component of the amplitude of acoustic signals transmitted by the transmitter and received by a receiver (e.g., the third receiver) in predetermined time intervals over a time period. The x-axis 1402 is associated with time and the y-axis 1404 is associated with the position (e.g., vertical depth) of the wireline tool within the borehole. Darker portions of the column 1400 correspond to negative amplitude and lighter portions of the column 1400 correspond to positive amplitude.

FIG. 15 depicts a log or column 1500 of the energy content associated with the amplitude of the in-line dipole component of the acoustic signals of FIG. 14 received by the fifteen receivers over the time period. The x-axis 1502 is associated with the respective receiver and the y-axis 1504 is associated with the position (e.g., the vertical depth) of the wireline tool within the borehole. In this example, the energy value at a particular borehole depth is associated with the sum of the amplitudes of the acoustic signals received by the corresponding receivers over the time period squared ($\Sigma A^2$) (e.g., sum of the squared amplitudes over the entire trace). Darker portions of the column 1500 correspond to lower energy values and, thus, may indicate the presence of a layer boundary between the transmitter and the corresponding receiver at the given borehole depth. Lighter portions of the column 1500 correspond to higher energy values and, thus, may indicate the absence of a layer boundary between the transmitter and the corresponding receiver at the given borehole depth. For example, the area represented by reference number 1506 may indicate the presence of a layer boundary because of the sharp contrast between light and dark. The angle of the darker and lighter portions represented by reference number 1508 is present because the first receiver is positioned closest to the transmitter and the fifteenth receiver is positioned farthest from the transmitter. Therefore, when the wireline tool is tripped out of a borehole, the first receiver will be first to be on the same side of the layer boundary as the transmitter and the fifteenth receiver will be last to be on the same side of the layer boundary as the transmitter.

FIG. 16 depicts a log or column 1600 of the monopole component of the amplitude of acoustic signals transmitted by the transmitter and received by a receiver in predetermined time intervals over a time period. The x-axis 1602 is associated with time and the y-axis 1604 is associated with the position (e.g., vertical depth) of the wireline tool within the borehole. Darker portions of the column 1600 correspond to negative amplitude and lighter portions of the column 1600 correspond to positive amplitude.

FIG. 17 depicts a log or column 1700 of the energy content associated with the amplitude of the monopole component of the acoustic signals of FIG. 16 received by the fifteen receivers over the time period. The x-axis 1702 is associated with the respective receiver and the y-axis 1704 is associated with the position (e.g., the vertical depth) of the wireline tool within the borehole. Darker portions of the column 1700 corresponds to lower energy values and, thus, may indicate the presence of a layer boundary between the transmitter and the corresponding receiver at the given borehole depth. Lighter portions of the column 1700 correspond to higher energy values and, thus, may indicate the absence of a layer boundary between the transmitter and the corresponding receiver at the given borehole depth. For example, the area represented by reference number 1706 may indicate the presence of a layer boundary because of the sharp contrast between dark and light.

Figure 18A:
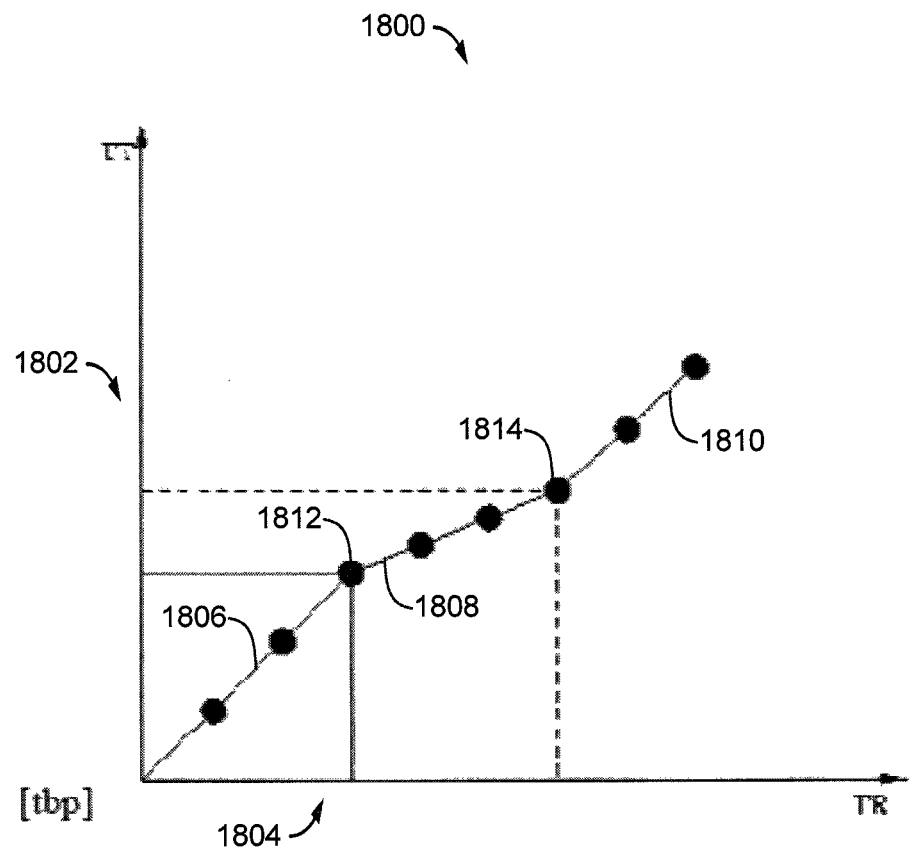
FIGS. 18-20 depict plots of results obtained using the examples described herein.

FIG. 18A depicts a graph or plot 1800 generated from information obtained using the examples described herein. The graph 1800 depicts the transit time (TT) of an acoustic signal as a function of the transmitter-to-receiver (TR) spacing. The y-axis 1802 corresponds to transit time (TT) of the acoustic signal and the x-axis 1804 corresponds to the transmitter-to-receiver spacing. The graph 1800 includes a first portion 1806 associated with a first slowness and a first layer of the formation, a second portion 1808 associated with a second slowness and a second layer of the formation and a third portion 1810 associated with a third slowness and a third layer of the formation. Each of the different portions 1806-1808 has a different slope, which may indicate the presence of a layer boundary between two receivers and/or two borehole positions, for example. Therefore, point 1812 may indicate a layer boundary between the first and second portions 1806 and 1808 and point 1814 may indicate a layer boundary between the second and third portions 1808 and 1810. By inverting the data of the graph 1800, the portions 1806-1810, the slopes of the portions 1806-1810 and/or the points 1812 and/or 1814 interconnecting the portions 1806-1810 may be identified. The information obtained by inverting the data of the graph 1800 may be used to determine (e.g., automatically determine) the number of bed boundaries within at least a portion of the formation, to estimate the velocity of the formation and/or to generate a bed boundary indicator, for example.

In some of the examples, the portions 1806-1810 may be expressed by Equation 1 below. Where $L_i$ represents a straight line (e.g., one of the portions 1806-1810) that can be defined by a point $P_i(TR_i, TT_i)$ and an angle $\theta$.

$$L_i = f(TR_i, TT_i, \theta_i; i =, \ldots, N_{Segment}) \quad \text{Equation 1}$$

By considering that $TT_i$ is fixed (e.g., uniformly) and, thus, $TT_i$ is the same as $TT_{i+1}$, $TR_{i+1}$ may be expressed as a function $L_i$ and $TR_i$ may be expressed as a function of $TR_{i+1}$ using Equation 2 below (e.g., recursion formula). Where $N_{Segment}$ represents the number of portions or straight lines (e.g., the portions 1806-1810) within the data (e.g., the analyzed data and/or the data points of the plot 1800).

$$TR_{i+1} = TR_i + \tan[\theta_i](TT_{i+1} - TT_i), i=2, \ldots, N_{Segment} \quad \text{Equation 2}$$

Equation 2 may be rewritten as Equation 3 below. Equation 3 illustrates that TR and the angles of the portions (e.g., the portions 1806-1810) are needed to solve the equation.

$$TR_{i+1} = TR_1 + \sum_{k=1}^{i} \tan[\theta_k](TT_{k+1} - TT_k), \quad \text{Equation 3}$$

$$i = 2, \ldots, N_{Segment}$$

Because, $TT_{i,\ i+1,\ N}$ are fixed, TR and the angles may be estimated as represented by Equation 4 below.

$$\{TR_1; \theta_1, \theta_2, \ldots \theta_N\}; i=1, N_{Segment} \quad \text{Equation 4}$$

The perpendicular error of a point of one of the portions 1806-1810 may be estimated. Because a line (e.g., one of the portions 1806-1810) may be expressed by a point $P_i(TR_i, TT_i)$ and an angle $\theta$, the perpendicular unit vector to this line may be defined using Equation 5.

$$\vec{a}_i = (-\cos \theta_i, \sin \theta_i) \quad \text{Equation 5}$$

If a plurality of points $\{\vec{T}_1, \vec{T}_2, \ldots, \vec{T}_{N_i}\}$ adjacent an area of one of the portions 1806-1810 is considered, the total perpendicular square error $\epsilon_i$ to the considered portion 1806-18101 may be defined as Equation 6.

$$\varepsilon_i = \sum_{k=1}^{N_i} \left|(\vec{T}_k - \vec{P}_i)^T \vec{a}_i\right|^2 \quad \text{Equation 6}$$

The global error E for all of the portions 1806-1810 may be defined by Equation 7. Where $N_{segment}$ represents the number of segments or portions (e.g., the portions 1806-1810) and $N_i$ represents the number of points in the respective segments or portions.

$$E = \sum_{i=1}^{N_{segment}} \varepsilon_i = \sum_{i=1}^{N_{segment}} \sum_{k=1}^{N_i} \left|(\vec{T}_k - \vec{P}_i)^T \vec{a}_i\right|^2 \quad \text{Equation 7}$$

Equation 7 may be expressed as a function of $\{TR_1; \theta_1, \theta_2, \ldots \theta_{N\_segment}\}$ illustrated by Equation 8 where $\vec{T}_k = (TR_k, TT_k)$.

$$E = \sum_{i=1}^{N_{segment}} \sum_{k=1}^{N_i} |-(TR_k - TR_i)\cos\theta_i + (TT_k - TT_i)\sin\theta_i|^2 \quad \text{Equation 8}$$

Using Equation 3 above, the total error may be determined using Equation 9. Equation 9 may be used to determine the total error after $N_{segment}$ has been fitted to the data.

$$E = \sum_{i=1}^{N_{segment}} \sum_{k=1}^{N_i} \left| [(TT_k - TT_i)\sin\theta_i] - \left[TR_k - \left(TR_i + \sum_{q=1}^{i} \tan[\theta_q](TT_{q+1} - TT_k)\right)\right] \cos\theta_i \right|^2 \quad \text{Equation 9}$$

Generally, a bed boundary may be present if two consecutive segments (e.g., the portions 1806-1810) have significant slowness differences and/or have slowness differences greater than a predetermined amount such as 10 us/ft, for example. However, the predetermined amount may be variable so any other suitable amount may be used instead.

To detect outliers within the data of the plot 1800, the Hampel Identifier test may be used. A series of peaks detected by the algorithm $P=\{p_k\}$ and the medium of the series $\hat{p}$ may be defined by Equation 10.

$$\hat{p} = \text{median}\{p_k\} \quad \text{Equation 10}$$

The median absolute deviation (MAD) scale estimator may be computed using Equation 11. By using Equation 11, $P_{mad}$ may be an unbiased estimator of the standard deviation when normalized in this way. $|p_k - \hat{p}|$ measures how far $p_k$ typically lies from the reference value $\hat{p}$ and the normalization factor of 1.4826 is used because the nominal part of the data sequence $\{p_k\}$ has a Gaussian distribution.

$$P_{mad} = 1.4826 \text{median}\{|p_k - \hat{p}|\} \quad \text{Equation 11}$$

Equation 12 may be used to determine the studentized deviations. In some examples, a point may be considered an outlier and/or suspicious if $|z_k| > 3$.

$$z_k = \frac{p_k - \hat{p}}{P_{mad}} \quad \text{Equation 12}$$

Figure 18B:
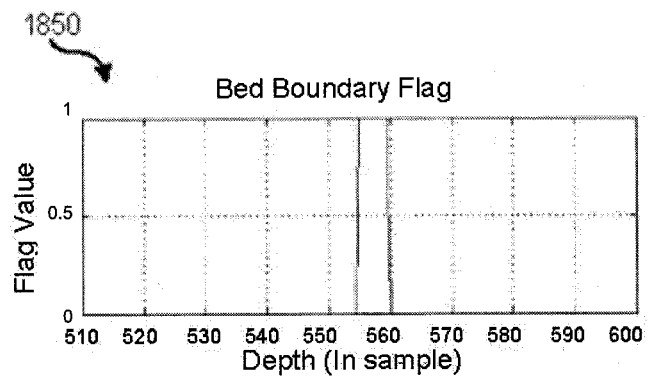
Figure 18C:
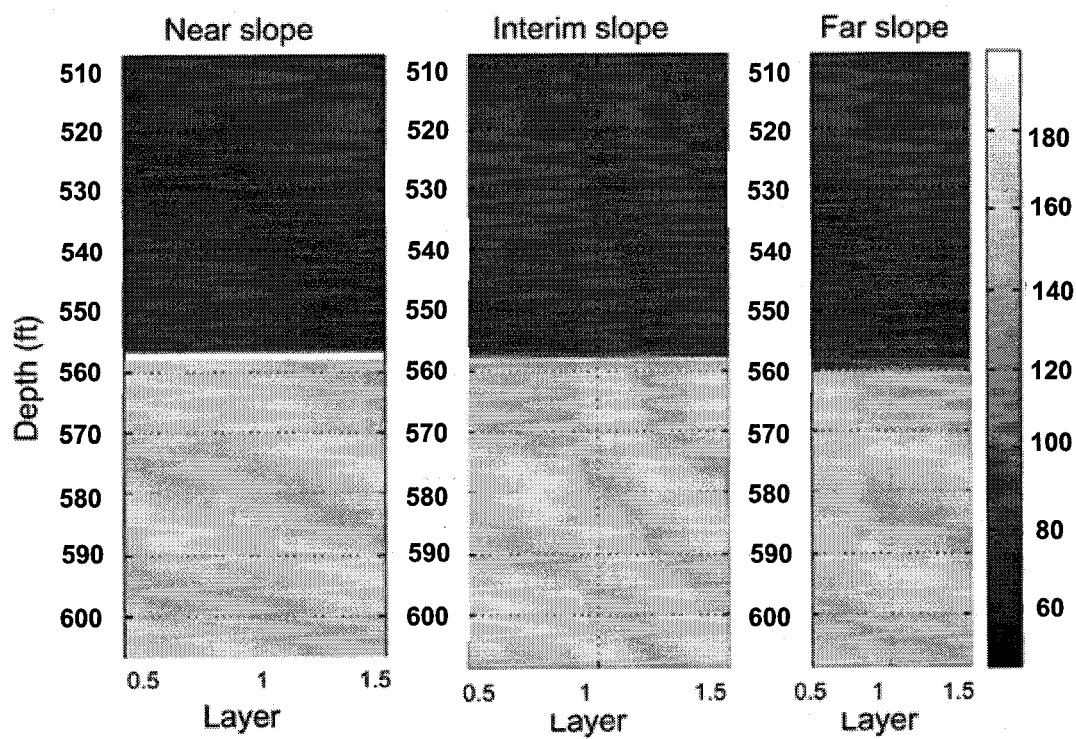

One or more of the equations above may be used to generate a bed boundary indicator 1850 as shown in FIG. 18B. Values corresponding to zero may indicate that no layer boundary is present while values corresponding to one or close to one may indicate the presence of a layer boundary. Additionally or alternatively, one or more of the equations above may be used to provide a slowness estimation for each of the portions 1806-1810 as shown in FIG. 18C. The near slope corresponds to the first portion 1806, the interim slope corresponds to the second portion 1808 and the far slope corresponds the third portion 1810.

Figures 19A, 19B, 19C:
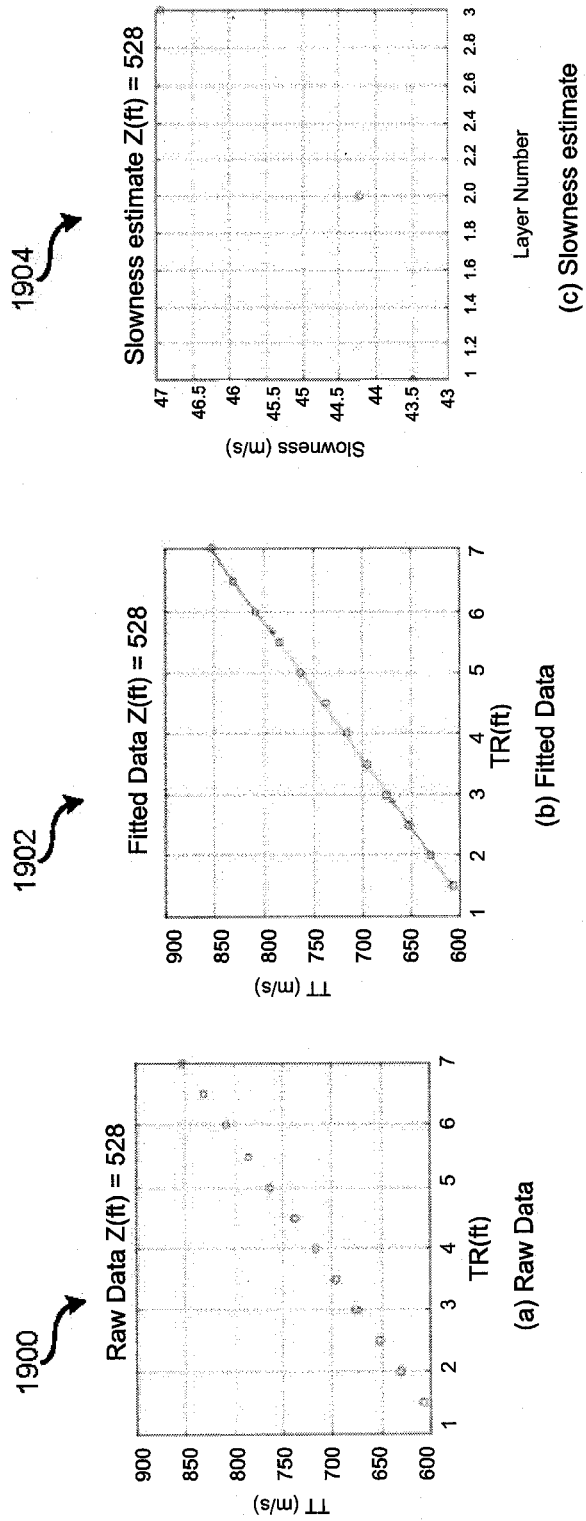
Figures 20A, 20B, 20C:
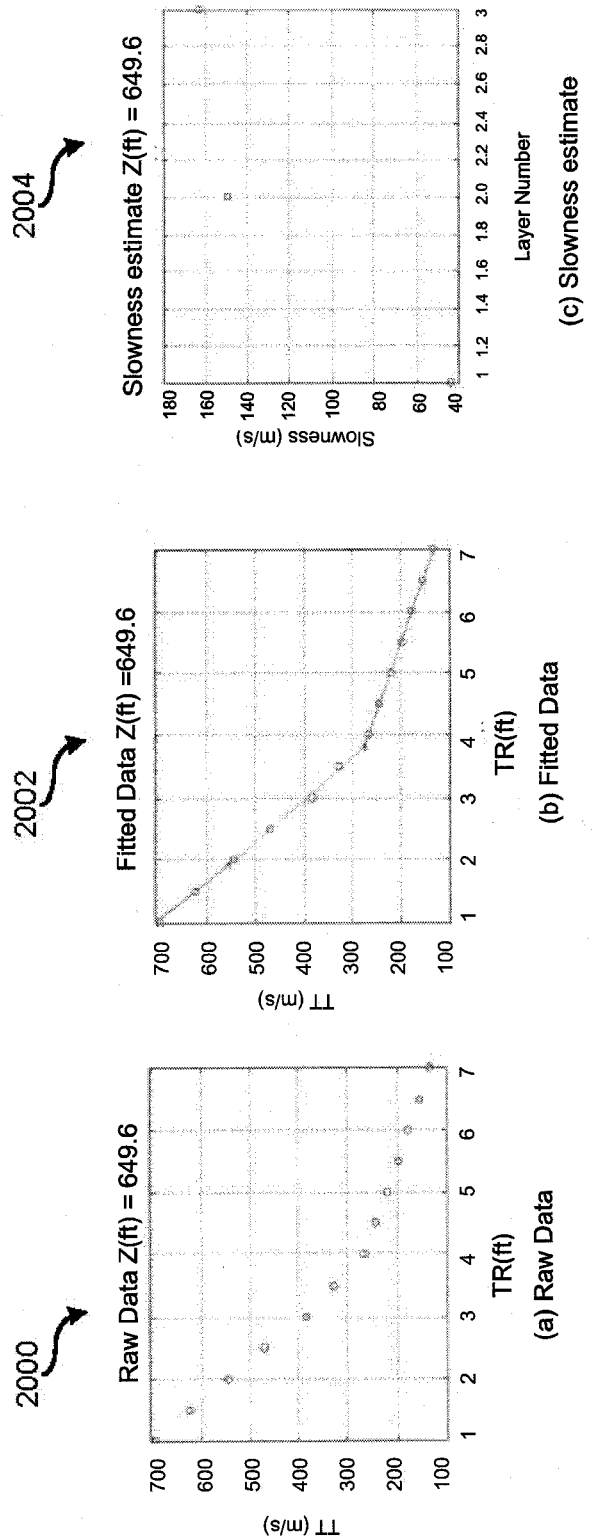

Turning to FIGS. 19A-C and FIGS. 20A-C. FIGS. 19A and 20A depict plots 1900 and 2000 of raw data received by the different receivers (e.g., transit time, transmitter to receiver spacing). FIGS. 19B and 20B depict plots 1902 and 2002 of the data of FIGS. 19A and 20A that has been fitted. FIG. 19B includes one slope, which may indicate the absence of a layer boundary and FIG. 20B include two slopes, which may indicate a layer boundary at the inflection point between the slopes. FIGS. 19C and 20C depict plots 1904 and 2004 of slowness estimates using the data from the plots 1900, 1902, 2000 and/or 2002, respectively.

Figure 21:
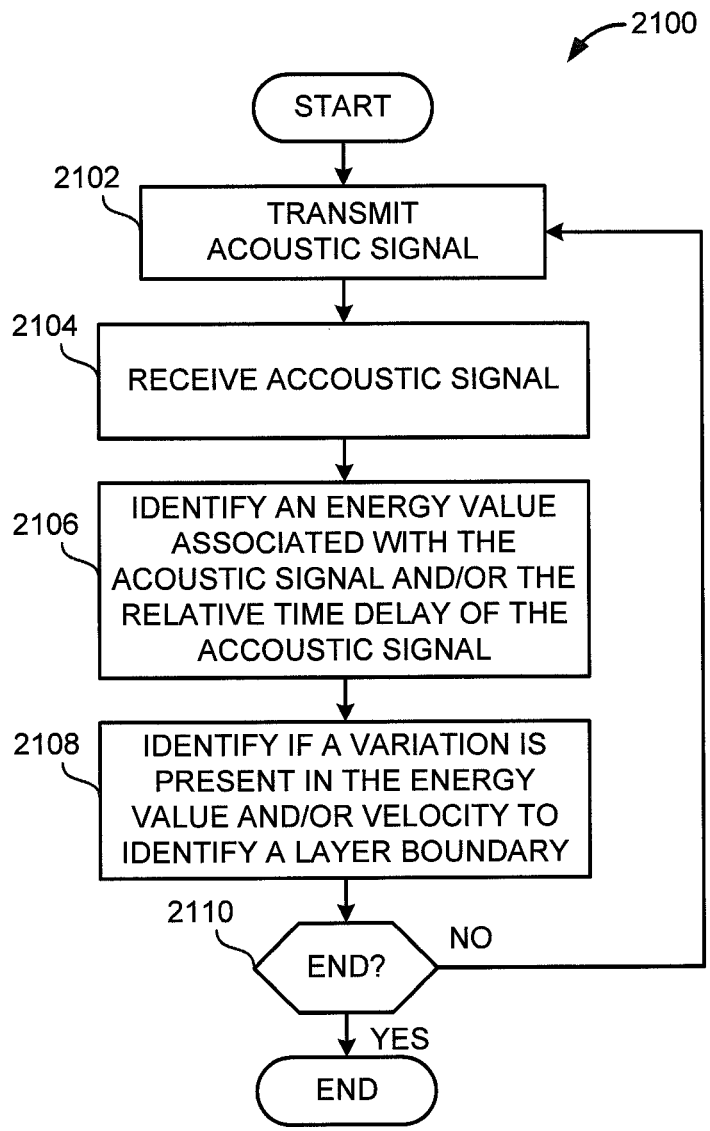
FIG. 21 is a flowchart of an example method that may be used to implement the examples described herein.

FIG. 21 is a flowchart of an example method 2100 that can be used in conjunction with the example apparatus described herein to identify a layer boundary in a formation. The example method 2100 of FIG. 21 may be used to implement any of the acoustic tools 22, 144 and/or 712 or any of the other examples described herein. The example method 2100 of FIG. 21 may be implemented using software and/or hardware. In some example implementations, the flowchart can be representative of example machine readable instructions, and the example method 2100 of the flowchart may be implemented entirely or in part by executing the machine readable instructions. Such machine readable instructions may be executed by the electronics and processing system 16, the processing and telemetry cartridge 20, the logging and control computer 160 and/or the processor 742, for example.

In particular, a processor or any other suitable device to execute machine readable instructions may retrieve such instructions from a memory device (e.g., a random access memory (RAM), a read only memory (ROM), etc.) and execute those instructions. In some example implementations, one or more of the operations depicted in the flowchart of FIG. 21 may be implemented manually. Although the example method 2100 is described with reference to the flowchart of FIG. 21, persons of ordinary skill in the art will readily appreciate that other methods to implement any of the acoustic tools 22, 144 and/or 712, the electronics and processing system 16, the processing and telemetry cartridge 20, the logging and control computer 160 and/or the processor 742 may additionally or alternatively be used. For example, the order of execution of the blocks depicted in the flowchart of FIG. 21 may be changed and/or some of the blocks described may be rearranged, eliminated, or combined.

The method may begin by transmitting an acoustic signal (block 2102) from the transmitter 28-34, 148, 714, which may then be received by one or more of the receivers 36, 150, 151 and/or 716-722 and/or one or more of the sensors 724-738 (block 2104). For the transmitted acoustic signals, the corresponding receivers 36, 150, 151 and/or 716-722 and/or the corresponding sensors 724-738 may record or log information (e.g., the amplitude) associated with the acoustic signal(s) in predetermined time intervals over a time period at a given borehole depth, for example. This information along with any other associated information may be transmitted to the data store 38, 156, 158 and/or 740 for storage.

The method 2100 may then identify an energy value associated with the acoustic signal and/or the relative time delays of the acoustic signal (block 2106). For example, to identify the energy value associated with the acoustic signal, the electronics and processing system 16, the processing and telemetry cartridge 20, the logging and control computer 160 and/or the processor 742 may initially utilize the information associated with the transmission of acoustic signals stored in the data store 38, 156, 158 and/or 740 to produce a log(s) of the amplitude of the acoustic signals received by the receivers 36, 150, 151 and/or 716-722 and/or the sensors 724-738 over a time period at different borehole depths. The electronics and processing system 16, the processing and telemetry cartridge 20, the logging and control computer 160 and/or the processor 742 may then utilize the log previously generated associated with the amplitude to produce a log(s) of the energy value of the acoustic signals received by the receivers 36, 150, 151 and/or 716-722 and/or the sensors 724-738 over the time period at the different borehole depths. In some examples, the energy value for a particular receiver 36, 150, 151 and/or 716-722 and/or sensor 724-738 at a particular borehole depth may be associated with the sum of the squared amplitude over the entire trace, for example.

In other examples, to identify the relative time delay of the acoustic signal, the electronics and processing system 16, the processing and telemetry cartridge 20, the logging and control computer 160 and/or the processor 742 may utilize the log previously generated associated with the amplitude to produce a log(s) or plot(s) of the relative time delay of the acoustic signals received by the respective receiver 36, 150, 151 and/or 716-722 and/or sensor 724-738 at different borehole depths.

The example method 2100 may then identify if at variation is present in the energy values associated with the acoustic signal and/or the relative time delay of the acoustic signal to identify a layer boundary (block 2108). If no variation is identified, this may indicate the absence of a layer boundary. In some examples, if the electronics and processing system 16, the processing and telemetry cartridge 20, the logging and control computer 160 and/or the processor 742 has generated a log(s) of the energy value of the acoustic signals received by the receivers 36, 150, 151 and/or 716-722 and/or the sensors 724-738 over the time period at the different borehole depths, a variation may be identified on the log(s) by a change in the energy values between two adjacent borehole depths. Such a change may indicate the presence of a layer boundary between the two positions. In other examples, if the electronics and processing system 16, the processing and telemetry cartridge 20, the logging and control computer 160 and/or the processor 742 has generated a log(s) or plot(s) of the relative time delays of the acoustic signals received by the respective receiver 36, 150, 151 and/or 716-722 and/or sensor 724-738 at different borehole depths, using non-linear inversion, a variation may automatically be identified by an interconnection between lines in the data. Such an interconnection between the lines may indicate the presence of a layer boundary between the two positions.

The method 2100 then determines whether it should transmit another acoustic signal (block 2110). If the method 2100 determines that it should transmit another acoustic signal, control advances to block 2102, otherwise the example method 2100 is ended.

Figure 31:
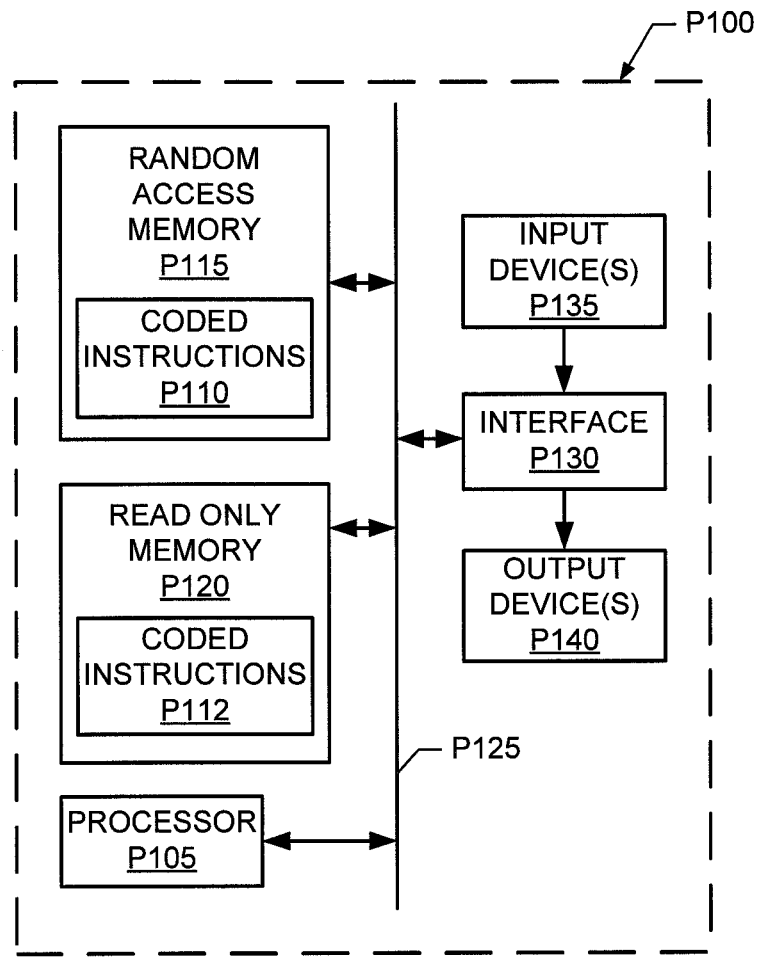
FIG. 31 is a schematic illustration of an example processor platform that may be used and/or programmed to implement any or all of the example methods and apparatus described herein.

FIG. 31 is a schematic diagram of an example processor platform P100 that may be used and/or programmed to implement to implementt the electronics and processing system 16, the processing and telemetry cartridge 20, the logging and control computer 160 and/or the processor 742. For example, the processor platform P100 can be implemented by one or more general purpose processors, processor cores, microcontrollers, etc.

The processor platform P100 of the example of FIG. 31 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general purpose input/output, etc. One or more input devices P135 and one or more output devices P140 are connected to the interface circuit P130.

The examples described herein may be used to determine (e.g., automatically determine) the number of bed boundaries, an estimation of the velocity of the formation and/or to generate a bed boundary indicator, for example. In some examples, to identify such formation properties, an acoustic signal may be transmitted to one or more receivers and then a log may be produced of the energy values associated with an acoustic impedance of the formation. In other examples, to identify such formation properties, an acoustic signal may be transmitted to one or more receivers and then a log associated with the relative time delays of the acoustic signal as received by the different receivers may be produced.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of identifying a layer boundary of a subterranean formation by using a downhole tool, comprising:
    introducing the downhole tool into a borehole that traverses the subsurface formation, wherein the downhole tool comprises a dipole or monopole transmitter to transmit an acoustic signal into the borehole of the subterranean formation, receivers spaced from the transmitter to receive at least a portion of the acoustic signal, and means for identifying the layer boundary of the subterranean formation based on the transmission of the acoustic signal between the transmitter and the receivers;
    transmitting an acoustic signal from the dipole or monopole transmitter into the borehole of the subterranean formation;
    receiving the acoustic signal at the receivers;
    logging energy values associated with the acoustic signal received by the receivers as the downhole tool is moved in the borehole; and
    identifying an angle associated with contrasting logged energy values with respect to depth and receiver to transmitter distance as being associated in part with receipt of transmitted acoustic signal energy subject to an impedance change in the subterranean formation to identify the layer boundary by using the means.

2. The method of claim 1, wherein the impedance change is associated with a first layer of the subterranean formation having a different impedance than a second adjacent layer of the subterranean formation.

3. The method of claim 1, wherein the angle in the logged energy values corresponds to a substantial decrease of the energy values.

4. The method of claim 1, wherein the angle in the logged energy values is associated with the dipole or monopole transmitter being located on one side of the layer boundary and each of the receivers being located on another side of the layer boundary.

5. The method of claim 1, further comprising determining a location of the layer boundary based on a depth of the at least one of the receivers within the borehole.

6. A downhole tool, comprising:
a dipole or monopole transmitter to transmit an acoustic signal into a borehole of a subterranean formation;
receivers spaced from the dipole or monopole transmitter to receive at least a portion of the acoustic signal; and
means for identifying a layer boundary of the subterranean formation based on the transmission of the acoustic signal between the dipole or monopole transmitter and the receivers by identifying an angle associated with contrasting energy values with respect to depth and receiver to transmitter distance, the contrasting energy values being associated in part with receipt of transmitted acoustic signal energy subject to an impedance change in the subterranean formation.

7. The method of claim 1 comprising, based on a direction of the dipole transmitter, weighting acoustic signal amplitude received at at least one of the receivers.

8. The downhole tool of claim 6 comprising means for weighting acoustic signal amplitude received at at least one of the receivers.

9. The method of claim 1 wherein the downhole tool comprises two dipole transmitters arranged orthogonally with respect to each other.

10. The method of claim 9 comprising identifying two angles, one associated with one of the two dipole transmitters and another one associated with the other of the two dipole transmitters.

11. The method of claim 1 wherein the logging energy values comprises summing squares of amplitudes over at least a portion of a trace for each of the receivers.

12. The method of claim 1 wherein the logging energy values comprises generating a log of the energy values with respect to depth and transmitter to receiver distance for each of the receivers.

13. The method of claim 1 wherein the logging energy values comprises generating a plot of energy values with respect to depth and transmitter to receiver distance for each of the receivers.

14. The method of claim 13 comprising identifying the angle based on the plot.

15. The downhole tool of claim 6 comprising two dipole transmitters arranged orthogonally with respect to each other.

16. The downhole tool of claim 15 comprising means for identifying two angles, one associated with one of the two dipole transmitters and another one associated with the other of the two dipole transmitters.

17. The downhole tool of claim 6 comprising means for summing squares of amplitudes over at least a portion of a trace for each of the receivers.

18. The downhole tool of claim 6 comprising means for generating a log of the energy values with respect to depth and transmitter to receiver distance for each of the receivers.

19. The downhole tool of claim 6 comprising means for generating a plot of energy values with respect to depth and transmitter to receiver distance for each of the receivers.

20. The downhole tool of claim 19 comprising identifying the angle based on the plot.

* * * * *